(12) United States Patent
Yoshitsugu et al.

(10) Patent No.: US 8,432,618 B2
(45) Date of Patent: Apr. 30, 2013

(54) ZOOM LENS SYSTEM, IMAGING DEVICE AND CAMERA

(75) Inventors: Keiki Yoshitsugu, Hyogo (JP); Katsu Yamada, Osaka (JP); Shunichiro Yoshinaga, Hyogo (JP)

(73) Assignee: Panasonic Corporation, Osaka (JP)

( * ) Notice: Subject to any disclaimer, the term of this patent is extended or adjusted under 35 U.S.C. 154(b) by 459 days.

(21) Appl. No.: 12/669,587

(22) PCT Filed: Jul. 23, 2008

(86) PCT No.: PCT/JP2008/001967
§ 371 (c)(1),
(2), (4) Date: Jan. 19, 2010

(87) PCT Pub. No.: WO2009/013900
PCT Pub. Date: Jan. 29, 2009

(65) Prior Publication Data
US 2010/0182491 A1    Jul. 22, 2010

(30) Foreign Application Priority Data

Jul. 25, 2007  (JP) .................. 2007-193554

(51) Int. Cl.
*G02B 15/14*   (2006.01)
(52) U.S. Cl.
USPC ........................................ 359/687; 359/685
(58) Field of Classification Search .................. 359/676, 359/684, 685, 687
See application file for complete search history.

(56) References Cited

U.S. PATENT DOCUMENTS

| | | |
|---|---|---|
| 5,585,966 A | 12/1996 | Suzuki |
| 2006/0132928 A1 | 6/2006 | Nakatani et al. |
| 2006/0140606 A1 | 6/2006 | Terada et al. |
| 2006/0291070 A1 | 12/2006 | Terada et al. |
| 2007/0052834 A1 | 3/2007 | Hashimoto et al. |

FOREIGN PATENT DOCUMENTS

| | | |
|---|---|---|
| JP | 07-199124 A | 8/1995 |
| JP | 2006-171655 A | 6/2006 |
| JP | 2006-184413 A | 7/2006 |
| JP | 2006-184416 A | 7/2006 |
| JP | 2006-189598 A | 7/2006 |
| JP | 2007-003554 A | 1/2007 |
| JP | 2007-010695 A | 1/2007 |
| JP | 2007-065525 A | 3/2007 |

OTHER PUBLICATIONS

International Search Report for PCT/JP2008/001967.

*Primary Examiner* — Alicia M Harrington
(74) *Attorney, Agent, or Firm* — Pearne & Gordon LLP

(57) ABSTRACT

A zoom lens system according to the present invention, from an object side, comprises a first lens unit having positive optical power, a second lens unit having negative optical power, a third lens unit having positive optical power, and a fourth lens unit having positive optical power. In zooming, the first to the fourth units all move along the optical axis. The third lens unit is composed of three or more lens elements. The condition (6): $nd_8 \leq 1.5$ and $vd_8 \geq 75$ and the condition (7): $(nd_9-1)+(nd_{10}-1) \geq 1.55$ are satisfied (where, $16 < f_T/f_W$, $\omega > 35$, and in the third lens unit: $nd_8$, $nd_9$, $nd_{10}$ are refractive indices to the d-line of the lens elements located on the most object side and at the second and the third positions from the object side; $vd_8$ is an Abbe number to the d-line of the lens element on the most object side; $\omega$ is a half view angle at a wide-angle limit; $f_T$ is a focal length of the entire system at a telephoto limit; and $f_W$ is a focal length of the entire system at a wide-angle limit). As a result, the zoom lens system has a reduced size and still realizes a wide view angle at a wide-angle limit, as well as a remarkably high zooming ratio and high performance.

4 Claims, 22 Drawing Sheets

ZOOM LENS SYSTEM, IMAGING DEVICE AND CAMERA

TECHNICAL FIELD

The present invention relates to a zoom lens system, an imaging device and a camera. In particular, the present invention relates to: a zoom lens system having a reduced size and still realizing a wide view angle at a wide-angle limit, as well as a remarkably high zooming ratio and high performance; an imaging device employing this zoom lens system; and a thin and compact camera employing this imaging device.

BACKGROUND ART

Remarkably strong demands are present for improved performance of cameras such as digital still cameras and digital video cameras (simply referred to as digital cameras, hereinafter) provided with an image sensor for performing photoelectric conversion. In particular, in order that a single digital camera should be capable of covering a wide focal length range from a wide-angle condition to a high telephoto condition, cameras employing a zoom lens system having a remarkably high zooming ratio are strongly demanded from a convenience point of view. Further, in recent years, zoom lens systems are also desired that have a wide angle range where the photographing field is wide.

As zoom lens systems having high zooming ratios and suitable for the above-mentioned digital cameras, for example, the following zoom lens systems have been proposed.

For example, Japanese Laid-Open Patent Publication No. 2006-171655 discloses an image-taking optical system at least comprising a first lens unit having positive optical power, a second lens unit having negative optical power, a third lens unit having positive optical power, and a fourth lens unit having positive optical power, wherein any of the lens unit intervals is changed so that variable magnification is achieved, and wherein the ratio between the focal length of the third lens unit and the focal length of the fourth lens unit and the ratio between the focal length of the first lens unit and the focal length of the entire optical system at a wide-angle limit are set forth.

Japanese Laid-Open Patent Publication No. 2006-184413 discloses an image-taking optical system at least comprising a first lens unit having positive optical power, a second lens unit having negative optical power, a third lens unit having positive optical power, and a fourth lens unit having positive optical power, wherein at least the first lens unit is moved so that variable magnification is achieved, and wherein the ratio between the distance from the surface located on the most image-taking object side in the first lens unit at a wide-angle limit to the image formation surface and the focal length of the entire optical system at a telephoto limit and the ratio between the focal length of the first lens unit and the focal length of the entire optical system at a wide-angle limit are set forth.

Japanese Laid-Open Patent Publication No. 2006-184416 discloses an image-taking optical system at least comprising a first lens unit having positive optical power, a second lens unit having negative optical power, a third lens unit having positive optical power, and a fourth lens unit having positive optical power, wherein any of the lens unit intervals is changed so that variable magnification is achieved, and wherein the ratio between the focal length of the first lens unit and the focal length of the entire optical system at a wide-angle limit, the ratio between the ratio of the focal length of the second lens unit at a telephoto limit and at a wide-angle limit and the ratio of the focal length of the entire optical system at a telephoto limit and at a wide-angle limit, and the ratio between the magnification of the third lens unit at a telephoto limit and the magnification of the third lens unit at a wide-angle limit are set forth.

Japanese Laid-Open Patent Publication No. 2006-189598 discloses an image-taking optical system at least comprising a first lens unit having positive optical power, a second lens unit having negative optical power, a third lens unit having positive optical power, and a fourth lens unit having positive optical power, wherein the third lens unit at least includes two positive optical power lenses and one negative optical power lens, wherein at least the second, the third, and the fourth lens units are moved so that variable magnification is achieved, and wherein the ratio between the focal length of the first lens unit and the focal length of the entire optical system at a wide-angle limit, the ratio between the focal length of the negative optical power lens in the third lens unit and the focal length of the third lens unit, and the refractive index of the negative optical power lens in the third lens unit are set forth.

Japanese Laid-Open Patent Publication No. 2007-003554 discloses a variable magnification optical system at least comprising a first lens unit having positive optical power, a second lens unit having negative optical power, a third lens unit having positive optical power, and a fourth lens unit having positive optical power, wherein at least the first and the third lens units are moved so that variable magnification is achieved, wherein in this magnification change, the first lens unit is moved to the object side, and wherein the ratio between the amount of relative movement of the second lens unit at the time of magnification change and the focal length of the entire optical system at a wide-angle limit, the ratio between the focal length of the first lens unit and the focal length of the entire optical system at a wide-angle limit, and the ratio between the focal length of the third lens unit and the focal length of the entire optical system at a telephoto limit are set forth.

Japanese Laid-Open Patent Publication No. 2007-010695 discloses a variable magnification optical system at least comprising a first lens unit having positive optical power, a second lens unit having negative optical power, a third lens unit having positive optical power, and a fourth lens unit having positive optical power, wherein at least the first lens unit is moved so that variable magnification is achieved, and wherein the ratio between the focal length of the first lens unit and the focal length of the entire optical system at a wide-angle limit and the average refractive index to the d-line of all lenses in the second lens unit are set forth.

Patent Document 1: Japanese Laid-Open Patent Publication No. 2006-171655
Patent Document 2: Japanese Laid-Open Patent Publication No. 2006-184413
Patent Document 3: Japanese Laid-Open Patent Publication No. 2006-184416
Patent Document 4: Japanese Laid-Open Patent Publication No. 2006-189598
Patent Document 5: Japanese Laid-Open Patent Publication No. 2007-003554
Patent Document 6: Japanese Laid-Open Patent Publication No. 2007-010695

DISCLOSURE OF THE INVENTION

Problems to be Solved by the Invention

The optical systems disclosed in the above-mentioned publications have high zooming ratios sufficient for application to digital cameras. Nevertheless, width of the view angle at a wide-angle limit and size reduction are not simultaneously realized. In particular, from the viewpoint of size reduction, requirements in digital cameras of recent years are not satisfied.

Objects of the present invention are to provide: a zoom lens system having a reduced size and still realizing a wide view angle at a wide-angle limit, as well as a remarkably high zooming ratio and high performance; an imaging device employing this zoom lens system; and a thin and compact camera employing this imaging device.

Solution to the Problems

One of the above-mentioned objects is achieved by the following zoom lens system. That is, the present invention relates to a zoom lens system, in order from an object side to an image side, comprising a first lens unit having positive optical power, a second lens unit having negative optical power, a third lens unit having positive optical power, and a fourth lens unit having positive optical power, wherein in zooming from a wide-angle limit to a telephoto limit, all of the first lens unit, the second lens unit, the third lens unit and the fourth lens unit move along an optical axis, wherein the third lens unit is composed of three or more lens elements, and wherein the following conditions (6) and (7) are satisfied:

$$nd_8 \leq 1.5 \text{ and } vd_8 \geq 75 \quad (6)$$

$$(nd_9-1)+(nd_{10}-1) \geq 1.55 \quad (7)$$

(here, $16 < f_T/f_W$ and $\omega > 35$)
where, $nd_8$ is a refractive index to the d-line of a lens element arranged on the most object side in the third lens unit, $nd_9$ is a refractive index to the d-line of a lens element arranged at the second position from the object side in the third lens unit, $nd_{10}$ is a refractive index to the d-line of a lens element arranged at the third position from the object side in the third lens unit, $vd_8$ is an Abbe number to the d-line of a lens element arranged on the most object side in the third lens unit, $\omega$ is a half view angle (°) at a wide-angle limit, $f_T$ is a focal length of the entire system at a telephoto limit, and $f_W$ is a focal length of the entire system at a wide-angle limit.

One of the above-mentioned objects is achieved by the following imaging device. That is, the present invention relates to an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein in zooming from a wide-angle limit to a telephoto limit, all of the first lens unit, the second lens unit, the third lens unit and the fourth lens unit move along an optical axis, wherein the third lens unit is composed of three or more lens elements, and wherein the following conditions (6) and (7) are satisfied:

$$nd_8 \leq 1.5 \text{ and } vd_8 \geq 75 \quad (6)$$

$$(nd_9-1)+(nd_{10}-1) \geq 1.55 \quad (7)$$

(here, $16 < f_T/f_W$ and $\omega > 35$)
where, $nd_8$ is a refractive index to the d-line of a lens element arranged on the most object side in the third lens unit, $nd_9$ is a refractive index to the d-line of a lens element arranged at the second position from the object side in the third lens unit, $nd_{10}$ is a refractive index to the d-line of a lens element arranged at the third position from the object side in the third lens unit, $vd_8$ is an Abbe number to the d-line of a lens element arranged on the most object side in the third lens unit, $\omega$ is a half view angle (°) at a wide-angle limit, $f_T$ is a focal length of the entire system at a telephoto limit, and $f_W$ is a focal length of the entire system at a wide-angle limit.

One of the above-mentioned objects is achieved by the following camera. That is, the present invention relates to a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein in zooming from a wide-angle limit to a telephoto limit, all of the first lens unit, the second lens unit, the third lens unit and the fourth lens unit move along an optical axis, wherein the third lens unit is composed of three or more lens elements, and wherein the following conditions (6) and (7) are satisfied:

$$nd_8 \leq 1.5 \text{ and } vd_8 \geq 75 \quad (6)$$

$$(nd_9-1)+(nd_{10}-1) \geq 1.55 \quad (7)$$

(here, $16 < f_T/f_W$ and $\omega > 35$)
where, $nd_8$ is a refractive index to the d-line of a lens element arranged on the most object side in the third lens unit, $nd_9$ is a refractive index to the d-line of a lens element arranged at the second position from the object side in the third lens unit, $nd_{10}$, is a refractive index to the d-line of a lens element arranged at the third position from the object side in the third lens unit, $vd_8$ is an Abbe number to the d-line of a lens element arranged on the most object side in the third lens unit, $\omega$ is a half view angle (°) at a wide-angle limit, $f_T$ is a focal length of the entire system at a telephoto limit, and $f_W$ is a focal length of the entire system at a wide-angle limit.

Effects Of The Invention

The present invention provides a zoom lens system having a reduced size and still realizes a wide view angle at a wide-angle limit, as well as a remarkably high zooming ratio and high performance. Further, according to the present invention, an imaging device employing this zoom lens system and a thin and compact camera employing this imaging device are provided.

DESCRIPTION OF THE REFERENCE CHARACTERS

| | |
|---|---|
| G1 | first lens unit |
| G2 | second lens unit |
| G3 | third lens unit |
| G4 | fourth lens unit |
| L1 | first lens element |
| L2 | second lens element |
| L3 | third lens element |
| L4 | fourth lens element |
| L5 | fifth lens element |
| L6 | sixth lens element |
| L7 | seventh lens element |
| L8 | eighth lens element |
| L9 | ninth lens element |
| L10 | tenth lens element |
| L11 | eleventh lens element |
| L12 | plane parallel plate |
| A | diaphragm |
| S | image surface |
| 1 | zoom lens system |
| 2 | image sensor |
| 3 | liquid crystal display monitor |
| 4 | body |
| 5 | main barrel |
| 6 | moving barrel |
| 7 | cylindrical cam |

BEST MODE FOR CARRYING OUT THE INVENTION (Embodiments 1 to 7)

Figure 1:
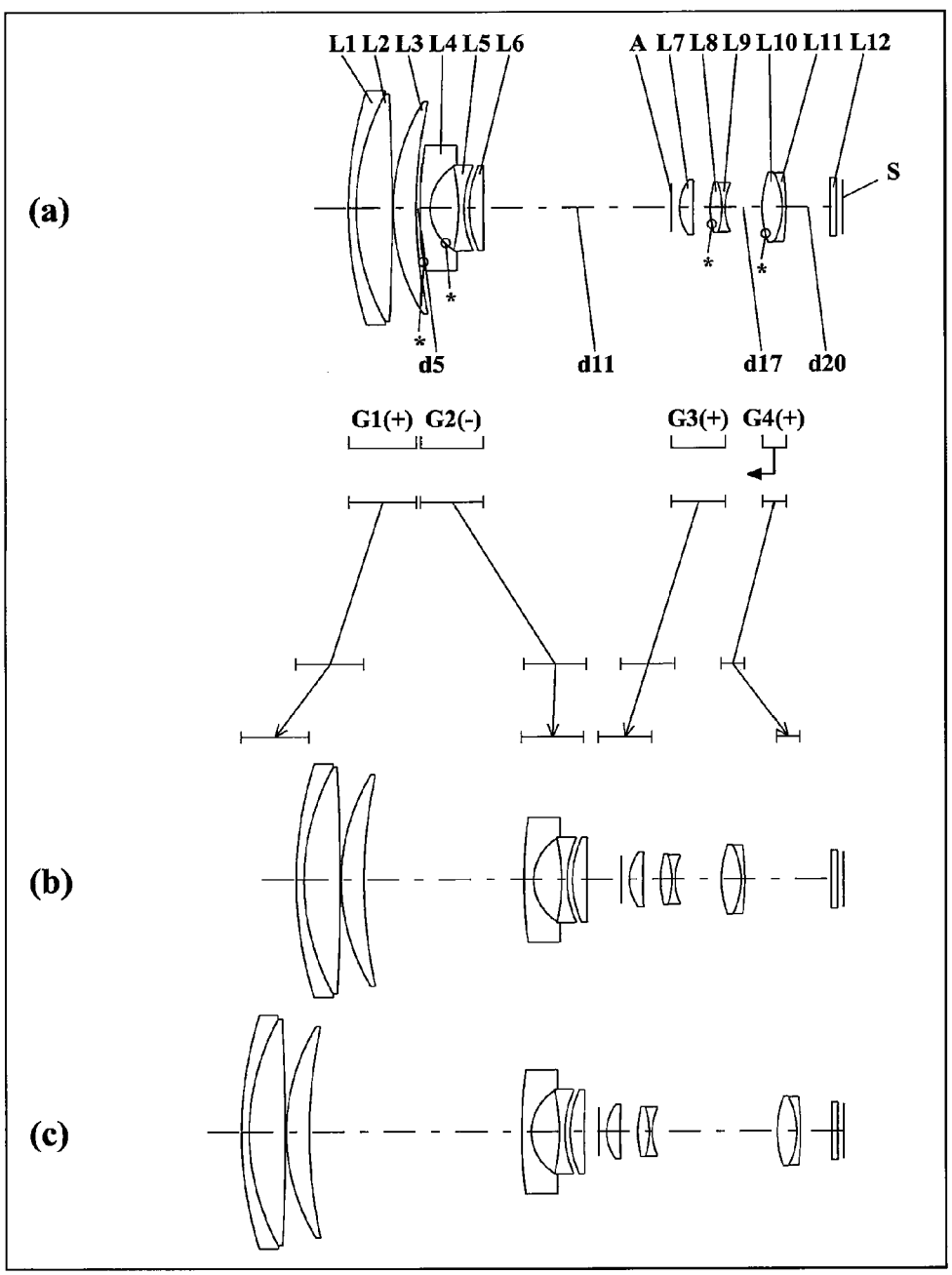
FIG. 1 is a lens arrangement diagram showing an infinity in-focus condition of a zoom lens system according to Embodiment 1 (Example 1).
Figure 4:
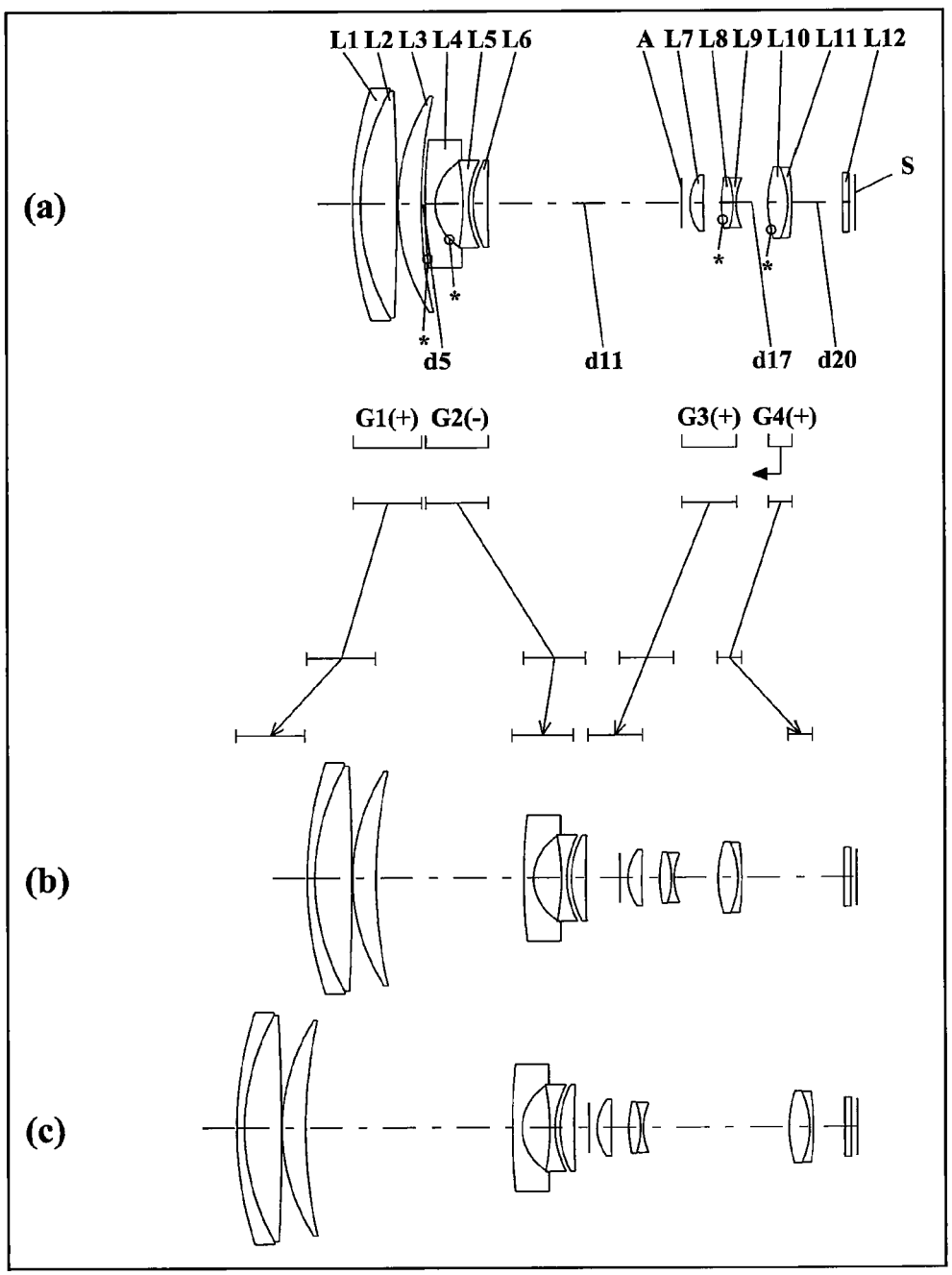
FIG. 4 is a lens arrangement diagram showing an infinity in-focus condition of a zoom lens system according to Embodiment 2 (Example 2).
Figure 7:
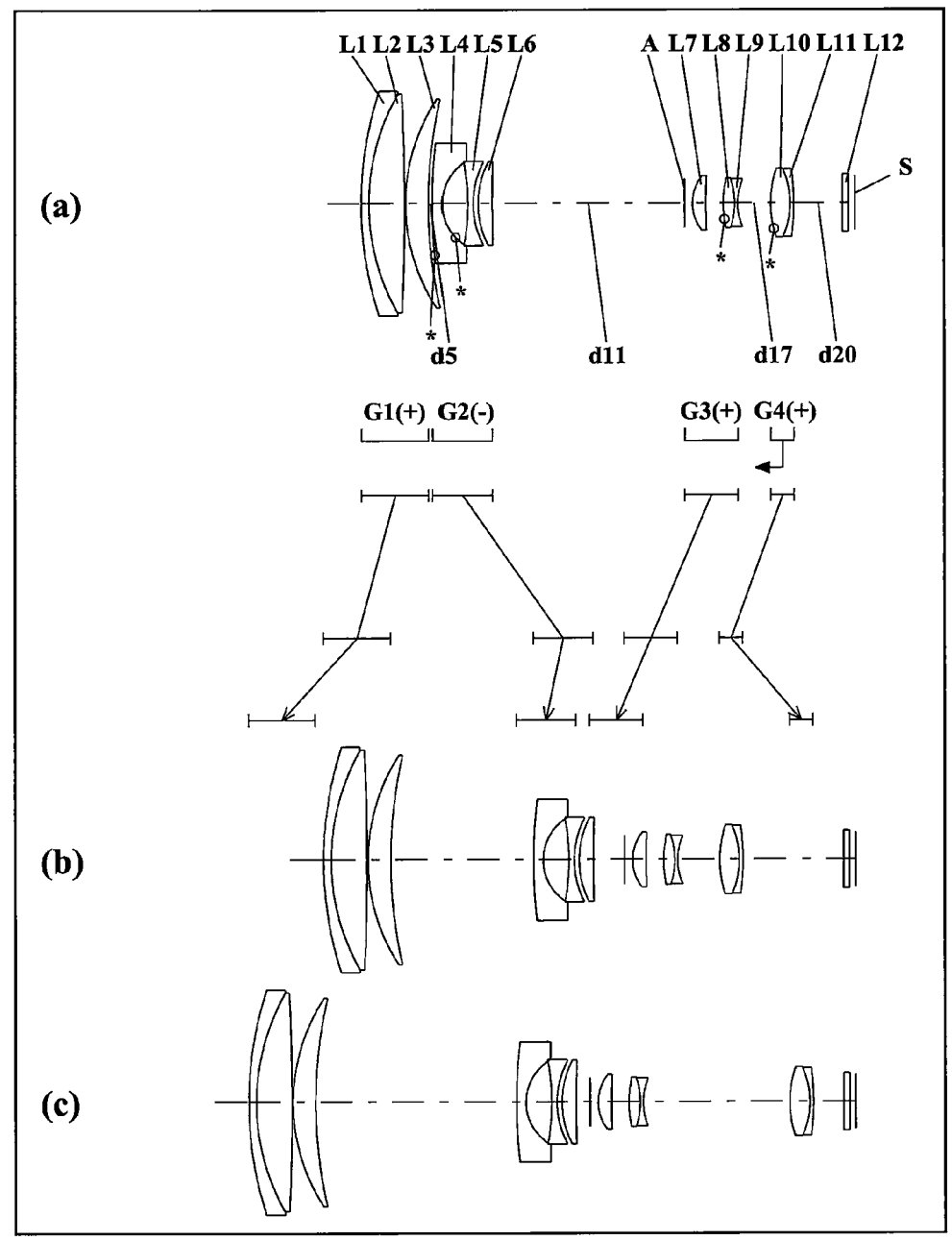
FIG. 7 is a lens arrangement diagram showing an infinity in-focus condition of a zoom lens system according to Embodiment 3 (Example 3).
Figure 10:
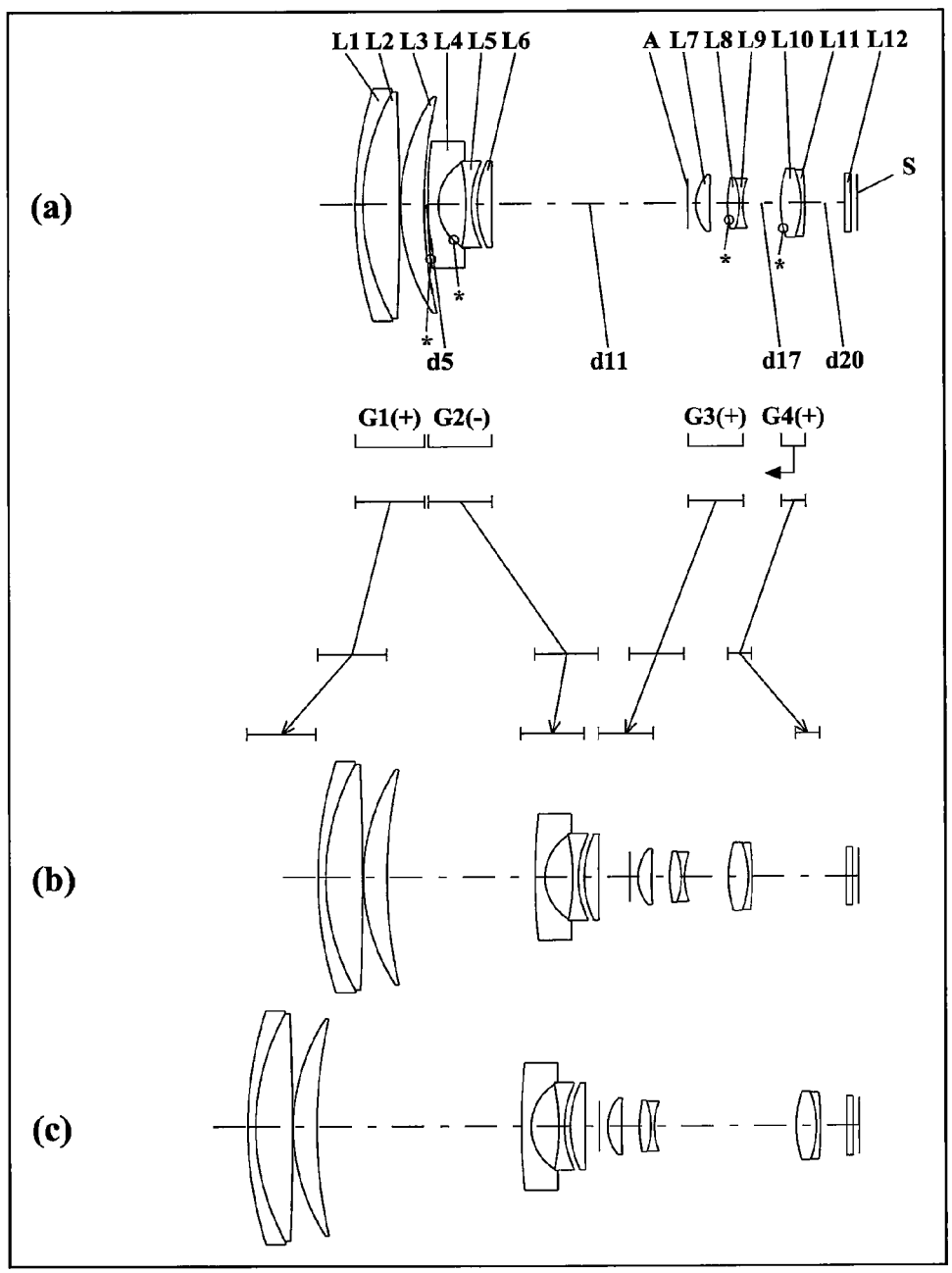
FIG. 10 is a lens arrangement diagram showing an infinity in-focus condition of a zoom lens system according to Embodiment 4 (Example 4).
Figure 13:
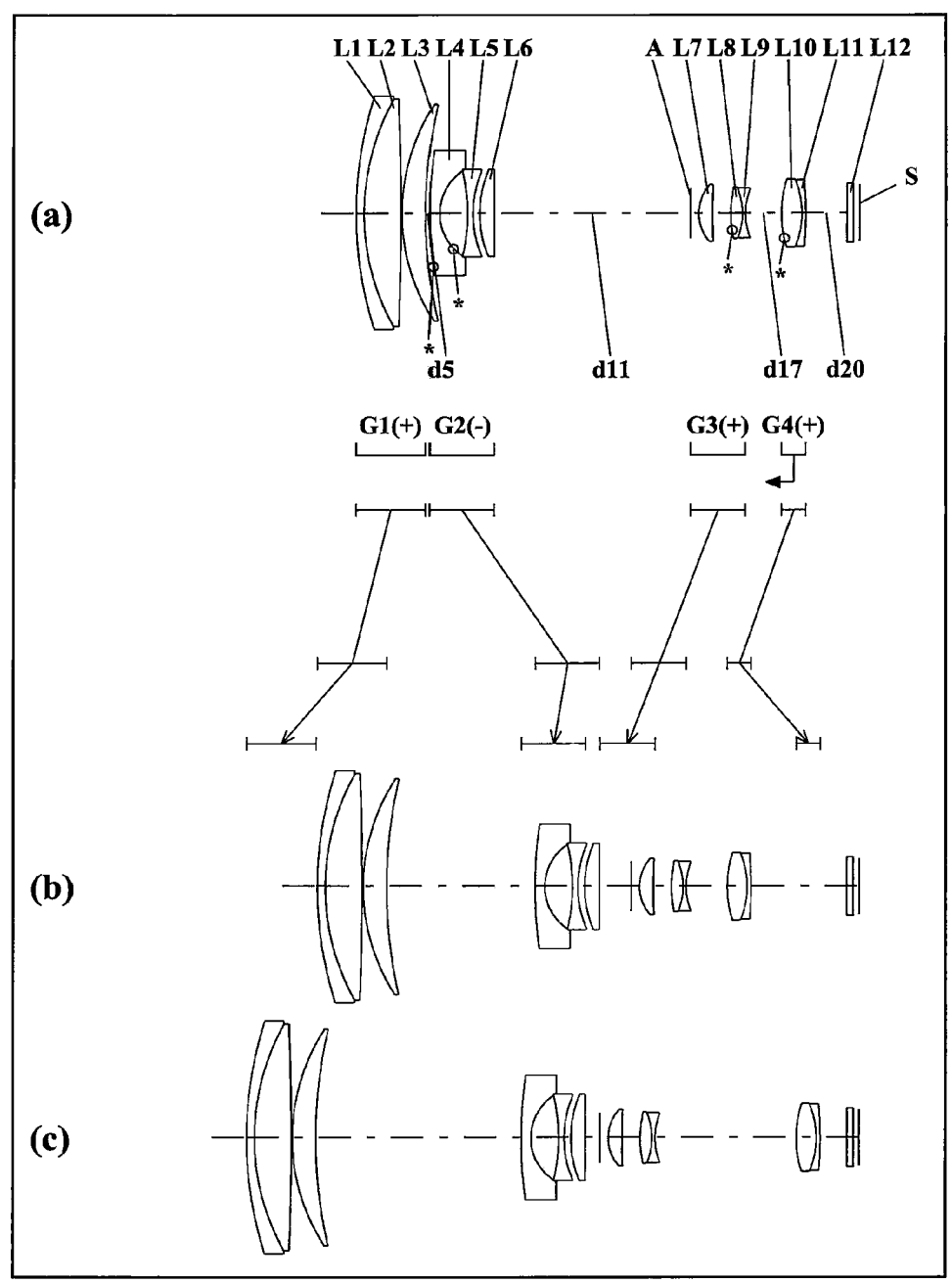
FIG. 13 is a lens arrangement diagram showing an infinity in-focus condition of a zoom lens system according to Embodiment 5 (Example 5).
Figure 16:
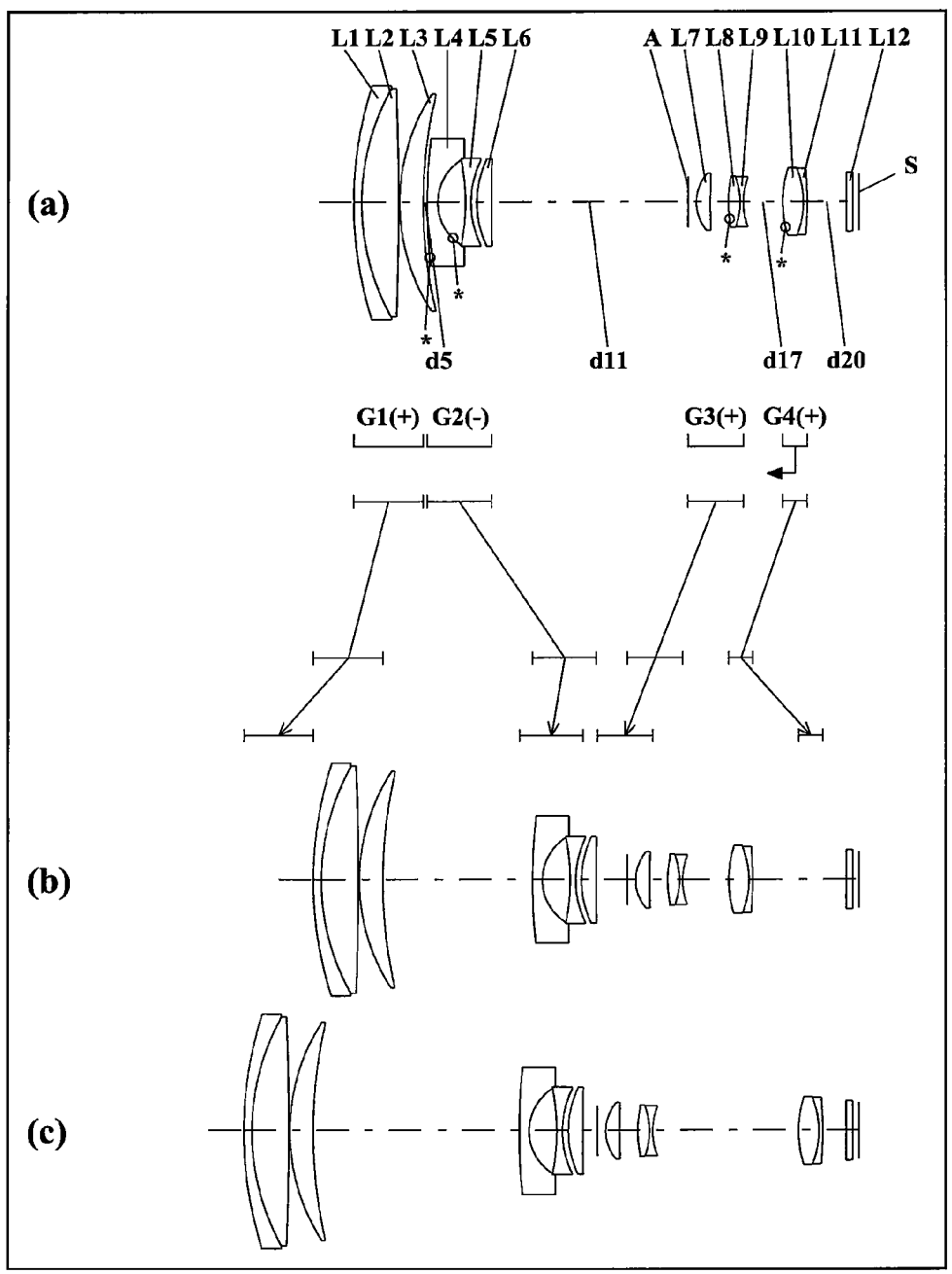
FIG. 16 is a lens arrangement diagram showing an infinity in-focus condition of a zoom lens system according to Embodiment 6 (Example 6).
Figure 19:
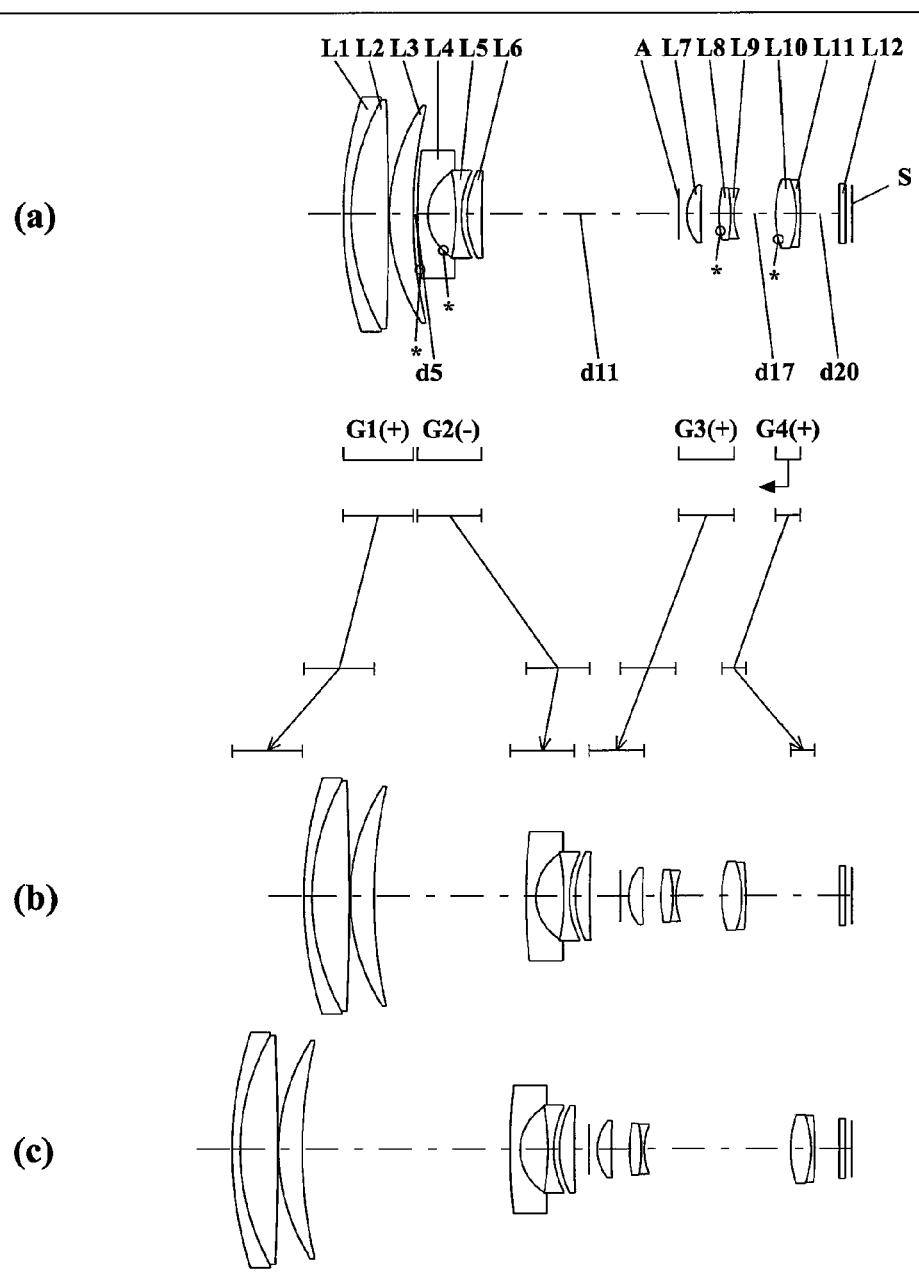
FIG. 19 is a lens arrangement diagram showing an infinity in-focus condition of a zoom lens system according to Embodiment 7 (Example 7).

FIG. 1 is a lens arrangement diagram of a zoom lens system according to Embodiment 1. FIG. 4 is a lens arrangement diagram of a zoom lens system according to Embodiment 2. FIG. 7 is a lens arrangement diagram of a zoom lens system according to Embodiment 3. FIG. 10 is a lens arrangement diagram of a zoom lens system according to Embodiment 4. FIG. 13 is a lens arrangement diagram of a zoom lens system according to Embodiment 5. FIG. 16 is a lens arrangement diagram of a zoom lens system according to Embodiment 6. FIG. 19 is a lens arrangement diagram of a zoom lens system according to Embodiment 7.

FIGS. 1, 4, 7, 10, 13, 16 and 19 show respectively a zoom lens system in an infinity in-focus condition. In each figure, part (a) shows a lens configuration at a wide-angle limit (in the minimum focal length condition: focal length $f_W$), part (b)

shows a lens configuration at a middle position (in an intermediate focal length condition: focal length $f_M=\sqrt{(f_W*f_T)}$), and part (c) shows a lens configuration at a telephoto limit (in the maximum focal length condition: focal length $f_T$). Further, in each figure, bent arrows provided between part (a) and part (b) are lines obtained by connecting the positions of the lens units at a wide-angle limit, at a middle position and at a telephoto limit, in order from the top to the bottom. Thus, straight lines are used simply between a wide-angle limit and a middle position and between a middle position and a telephoto limit. That is, these straight lines do not indicate the actual motion of the individual lens units. Moreover, in each figure, an arrow provided to a lens unit indicates focusing from an infinity in-focus condition to a close-object in-focus condition, that is, the moving direction at the time of focusing from an infinity in-focus condition to a close-object in-focus condition.

The zoom lens system according to each embodiment, in order from the object side to the image side, comprises a first lens unit G1 having positive optical power, a second lens unit G2 having negative optical power, a third lens unit G3 having positive optical power, and a fourth lens unit G4 having positive optical power. Then, in zooming from a wide-angle limit to a telephoto limit, the first lens unit G1, the second lens unit G2, the third lens unit G3 and the fourth lens unit G4 all move along the optical axis (this lens configuration is referred to as the basic configuration of the embodiments, hereinafter). In the zoom lens system according to each embodiment, these lens units are arranged into a desired optical power arrangement, so that a remarkably high zooming ratio exceeding 16 and high optical performance are achieved and still size reduction is realized in the entire lens system.

In FIGS. 1, 4, 7, 10, 13, 16 and 19, an asterisk "*" provided to a particular surface indicates that the surface is aspheric. Further, in each figure, a symbol (+) or (−) provided to the sign of each lens unit corresponds to the sign of optical power of the lens unit. Moreover, in each figure, the straight line located on the most right-hand side indicates the position of an image surface S. On the object side relative to the image surface S (between the image surface S and the most image side lens surface of the fourth lens unit G4), a plane parallel plate such as an optical low-pass filter and a face plate of an image sensor is provided. Moreover, in each figure, a diaphragm A is provided between the most image side lens surface of the second lens unit G2 and the most object side lens surface of the third lens unit G3.

As shown in FIG. 1, in the zoom lens system according to Embodiment 1, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment 1, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

Further, in the zoom lens system according to Embodiment 1, the third lens unit G3, in order from the object side to the image side, comprises: a positive meniscus seventh lens element L7 with the convex surface facing the object side; a bi-convex eighth lens element L8; and a bi-concave ninth lens element L9. Among these, the eighth lens element L8 and the ninth lens element L9 are cemented with each other.

Further, in the zoom lens system according to Embodiment 1, the fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other.

Here, in the zoom lens system according to Embodiment 1, a plane parallel plate L12 is provided on the object side relative to the image surface S (between the image surface S and the eleventh lens element L11).

In the zoom lens system according to Embodiment 1, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

As shown in FIG. 4, in the zoom lens system according to Embodiment 2, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment 2, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

Further, in the zoom lens system according to Embodiment 2, the third lens unit G3, in order from the object side to the image side, comprises: a positive meniscus seventh lens element L7 with the convex surface facing the object side; a bi-convex eighth lens element L8; and a bi-concave ninth lens element L9. Among these, the eighth lens element L8 and the ninth lens element L9 are cemented with each other.

Further, in the zoom lens system according to Embodiment 2, the fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other.

Here, in the zoom lens system according to Embodiment 2, a plane parallel plate L12 is provided on the object side relative to the image surface S (between the image surface S and the eleventh lens element L11).

In the zoom lens system according to Embodiment 2, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

As shown in FIG. 7, in the zoom lens system according to Embodiment 3, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment 3, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

Further, in the zoom lens system according to Embodiment 3, the third lens unit G3, in order from the object side to the image side, comprises: a positive meniscus seventh lens element L7 with the convex surface facing the object side; a bi-convex eighth lens element L8; and a bi-concave ninth lens element L9. Among these, the eighth lens element L8 and the ninth lens element L9 are cemented with each other.

Further, in the zoom lens system according to Embodiment 3, the fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other.

Here, in the zoom lens system according to Embodiment 3, a plane parallel plate L12 is provided on the object side relative to the image surface S (between the image surface S and the eleventh lens element L11).

In the zoom lens system according to Embodiment 3, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

As shown in FIG. 10, in the zoom lens system according to Embodiment 4, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment 4, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

Further, in the zoom lens system according to Embodiment 4, the third lens unit G3, in order from the object side to the image side, comprises: a positive meniscus seventh lens element L7 with the convex surface facing the object side; a bi-convex eighth lens element L8; and a bi-concave ninth lens element L9. Among these, the eighth lens element L8 and the ninth lens element L9 are cemented with each other.

Further, in the zoom lens system according to Embodiment 4, the fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other.

Here, in the zoom lens system according to Embodiment 4, a plane parallel plate L12 is provided on the object side relative to the image surface S (between the image surface S and the eleventh lens element L11).

In the zoom lens system according to Embodiment 4, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

As shown in FIG. 13, in the zoom lens system according to Embodiment 5, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment 5, the second lens unit G2, in order from the object side to the image side, comprises: a negative meniscus fourth lens element L4 with the convex surface facing the object side; a bi-concave fifth lens element L5; and a planar-convex sixth lens element L6 with the convex surface facing the object side.

Further, in the zoom lens system according to Embodiment 5, the third lens unit G3, in order from the object side to the image side, comprises: a positive meniscus seventh lens element L7 with the convex surface facing the object side; a bi-convex eighth lens element L8; and a bi-concave ninth lens element L9. Among these, the eighth lens element L8 and the ninth lens element L9 are cemented with each other.

Further, in the zoom lens system according to Embodiment 5, the fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other.

Here, in the zoom lens system according to Embodiment 5, a plane parallel plate L12 is provided on the object side relative to the image surface S (between the image surface S and the eleventh lens element L11).

In the zoom lens system according to Embodiment 5, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

As shown in FIG. 16, in the zoom lens system according to Embodiment 6, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment 6, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

Further, in the zoom lens system according to Embodiment 6, the third lens unit G3, in order from the object side to the image side, comprises: a positive meniscus seventh lens element L7 with the convex surface facing the object side; a bi-convex eighth lens element L8; and a bi-concave ninth lens element L9. Among these, the eighth lens element L8 and the ninth lens element L9 are cemented with each other.

Further, in the zoom lens system according to Embodiment 6, the fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other.

Here, in the zoom lens system according to Embodiment 6, a plane parallel plate L12 is provided on the object side relative to the image surface S (between the image surface S and the eleventh lens element L11).

In the zoom lens system according to Embodiment 6, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

As shown in FIG. 19, in the zoom lens system according to Embodiment 7, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment 7, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

Further, in the zoom lens system according to Embodiment 7, the third lens unit G3, in order from the object side to the image side, comprises: a positive meniscus seventh lens element L7 with the convex surface facing the object side; a bi-convex eighth lens element L8; and a bi-concave ninth lens element L9. Among these, the eighth lens element L8 and the ninth lens element L9 are cemented with each other.

Further, in the zoom lens system according to Embodiment 7, the fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other.

Here, in the zoom lens system according to Embodiment 7, a plane parallel plate L12 is provided on the object side relative to the image surface S (between the image surface S and the eleventh lens element L11).

In the zoom lens system according to Embodiment 7, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

In the zoom lens system according to each embodiment, in zooming from a wide-angle limit to a telephoto limit, the first lens unit G1, the second lens unit G2, the third lens unit G3 and the fourth lens unit G4 all move along the optical axis. Among these lens units, for example, the third lens unit is moved in a direction perpendicular to the optical axis, so that image blur caused by hand blurring, vibration and the like can be compensated optically.

In the present invention, when the image blur is to be compensated optically, the third lens unit moves in a direction perpendicular to the optical axis as described above, so that image blur is compensated in a state that size increase in the entire zoom lens system is suppressed and a compact construction is realized and that excellent imaging characteristics such as small decentering coma aberration and decentering astigmatism are satisfied.

The following description is given for conditions desired to be satisfied by a zoom lens system having the above-mentioned basic configuration like the zoom lens system according to Embodiments 1 to 7. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect can be obtained.

Further, all conditions described below hold only under the following two premise conditions, unless noticed otherwise.

$$16 < f_T/f_W$$

$$\omega > 35$$

where, $f_T$ is a focal length of the entire system at a telephoto limit, $f_W$ is a focal length of the entire system at a wide-angle limit, and ω is a half view angle (°) at a wide-angle limit.

In a zoom lens system having the basic configuration, the third lens unit is composed of three or more lens elements, and the following condition (6) is satisfied.

$$nd_8 \leq 1.5 \text{ and } vd_8 \geq 75 \tag{6}$$

where, $nd_8$ is a refractive index to the d-line of a lens element arranged on the most object side in the third lens unit, and $vd_8$ is an Abbe number to the d-line of a lens element arranged on the most object side in the third lens unit.

The condition (6) sets forth a relation to be satisfied by the lens element contained in the third lens unit. When the values fall outside the ranges of the condition (6), aberration, especially, axial chromatic aberration, in the third lens unit cannot be compensated. Thus, thickness reduction and high performance cannot simultaneously be achieved. In particular, when the ranges of the condition (6) are not satisfied, it becomes difficult that, for example, the third lens unit is moved in a direction perpendicular to the optical axis for blur compensation.

In a zoom lens system having the basic configuration, the third lens unit is composed of three or more lens elements, and the following condition (7) is satisfied together with the condition (6).

$$(nd_9-1)+(nd_{10}-1) \geq 1.55 \tag{7}$$

where, $nd_9$ is a refractive index to the d-line of a lens element arranged at the second position from the object side in the third lens unit, and $nd_{10}$ is a refractive index to the d-line of a lens element arranged at the third position from the object side in the third lens unit.

The condition (7) sets forth a relation to be satisfied by the lens elements contained in the third lens unit. When the value falls outside the range of the condition (7), aberration, especially, axial chromatic aberration, in the third lens unit cannot be compensated. Thus, thickness reduction and high performance cannot simultaneously be achieved. In particular, when the range of the condition (7) is not satisfied, it becomes difficult that, for example, the third lens unit is moved in a direction perpendicular to the optical axis for blur compensation.

When the following condition (7)' is satisfied, the above-mentioned effect is achieved more successfully.

$$(nd_9-1)+(nd_{10}-1) \geq 1.6 \tag{7}'$$

In a zoom lens system having the above-mentioned basic configuration like each zoom lens system according to Embodiments 1 to 7, it is preferable that the following condition (1) is satisfied.

$$0 < \sqrt{(f_4 \cdot f_W \tan \omega)} / L_W < 0.13 \tag{1}$$

where,

ω is a half view angle (°) at a wide-angle limit, $L_W$ is an overall optical axial length of the entire system at a wide-angle limit (a distance from the most object side surface to the most image side surface), $f_4$ is a focal length of the fourth lens unit, and $f_W$ is a focal length of the entire system at a wide-angle limit.

The condition (1) substantially sets forth the focal length of the fourth lens unit. When the value exceeds the upper limit of the condition (1), the optical power of the fourth lens unit is excessively weak, and hence the necessary amount of movement in zooming increases. Thus, it is difficult in some cases to achieve a thin lens barrel configuration. Further, when the value exceeds the upper limit of the condition (1), it becomes difficult to achieve a satisfactory peripheral illuminance on the image surface especially at a wide-angle limit. Thus, this situation is not preferable.

In a zoom lens system having the above-mentioned basic configuration like each zoom lens system according to Embodiments 1 to 7, it is preferable that the following condition (2) is satisfied.

$$0.05 \leq f_3/f_4 \leq 0.97 \tag{2}$$

where, $f_3$ is a focal length of the third lens unit, and $f_4$ is a focal length of the fourth lens unit.

The condition (2) sets forth the ratio between the focal length of the third lens unit and the focal length of the fourth lens unit. When the value exceeds the upper limit of the condition (2), the focal length of the third lens unit is excessively long. Thus, the amount of movement of the third lens unit necessary for achieving a high magnification exceeding 16 increases. Accordingly, this situation is not preferable. Further, when the value exceeds the upper limit of the condition (2), in some cases, it becomes difficult that, for example, the third lens unit is moved in a direction perpendicular to the optical axis for blur compensation. In contrast, when the value goes below the lower limit of the condition (2), the focal length of the third lens unit is excessively short. Thus, a large aberration fluctuation arises in zooming so as to cause difficulty in compensation. Further, the absolute values of various kinds of aberration generated in the third lens unit increase excessively, and hence compensation becomes difficult. Thus, this situation is not preferable. Moreover, when the value goes below the lower limit of the condition (2), an excessively high error sensitivity to the inclination between the surfaces in the third lens unit is caused. This causes in some cases difficulty in assembling the optical system.

In a zoom lens system having the above-mentioned basic configuration like each zoom lens system according to Embodiments 1 to 7, it is preferable that the following condition (8) is satisfied.

$$0.15 < dG3/dG < 0.27 \tag{8}$$

where, dG3 is an optical axial center thickness of the third lens unit, and dG is a sum of the optical axial thicknesses of the first lens unit, the second lens unit, the third lens unit and the fourth lens unit.

The condition (8) sets forth the optical axial thickness of the third lens unit. When the value exceeds the upper limit of the condition (8), the thickness of the third lens unit is excessively great, and hence it is difficult in some cases to achieve a compact lens system. Further, when the value exceeds the upper limit of the condition (8), the thickness of the third lens unit is excessively great, and hence it becomes difficult that, for example, the third lens unit is moved in a direction perpendicular to the optical axis for blur compensation. In contrast, when the value goes below the lower limit of the condition (8), difficulty arises in compensating various kinds of aberration to be compensated by the third lens unit, especially in compensating spherical aberration and coma aberration at a wide-angle limit. Thus, this situation is not preferable.

Here, when at least one of the following conditions (8)' and (8)" is satisfied, the above-mentioned effect is achieved more successfully.

$$0.19 < dG3/dG \tag{8}'$$

$$dG3/dG < 0.22 \tag{8}''$$

In a zoom lens system having the above-mentioned basic configuration like each zoom lens system according to Embodiments 1 to 7, it is preferable that the following condition (9) is satisfied.

$$2.7 < \sqrt{(f_3^2+f_4^2)}/|f_2| < 3.6 \tag{9}$$

where, $f_2$ is a focal length of the second lens unit, $f_3$ is a focal length of the third lens unit, and $f_4$ is a focal length of the fourth lens unit.

The condition (9) sets forth the focal lengths of the lens units. When the value exceeds the upper limit of the condition (9), the absolute value of the optical power of the second lens unit is relatively strong excessively. Thus, compensation of various kinds of aberration, especially, compensation of distortion at a wide-angle limit, becomes difficult. Thus, this situation is not preferable. In contrast, when the value goes below the lower limit of the condition (9), the absolute value of the optical power of the second lens unit is relatively weak excessively. Thus, in a case that a zoom lens system having a high magnification is to be achieved, the necessary amount of movement of the second lens unit is excessively great. Thus, this situation is not preferable.

Here, when at least one of the following conditions (9)' and (9)" is satisfied, the above-mentioned effect is achieved more successfully.

$$2.8 < \sqrt{(f_3^2+f_4^2)}/|f_2| \tag{9}'$$

$$\sqrt{(f_3^2+f_4^2)}/|f_2| < 3.5 \tag{9}''$$

In a zoom lens system having the above-mentioned basic configuration like each zoom lens system according to Embodiments 1 to 7, it is preferable that the following condition (10) is satisfied.

$$1.95 < m_{2T}/m_{34T} < 3.47 \tag{10}$$

where, $m_{2T}$ is a lateral magnification of the second lens unit at a telephoto limit, and $m_{34T}$ is a lateral magnification at a telephoto limit of a composite lens unit consisting of all lens units located on the image side relative to the second lens unit.

The condition (10) sets forth the magnification of the lens units at a telephoto limit. When the value exceeds the upper limit of the condition (10), the overall length at a telephoto limit is excessively great, and hence difficulty arises in realizing a compact zoom lens system. Further, for example, in a case that the lens units on the image side relative to the second lens unit are moved in a direction perpendicular to the optical axis so that blur compensation is achieved, an excessively large aberration fluctuation is caused. Thus, this situation is not preferable. In contrast, when the value goes below the lower limit of the condition (10), similarly, for example, in a case that the lens units on the image side relative to the second lens unit are moved in a direction perpendicular to the optical axis so that blur compensation is achieved, an excessively large aberration fluctuation is caused. Thus, this situation is not preferable.

Here, when at least one of the following conditions (10)' and (10)" is satisfied, the above-mentioned effect is achieved more successfully.

$$2.2 < m_{2T}/m_{34T} \tag{10}'$$

$$m_{2T}/m_{34T} < 3.2 \tag{10}''$$

In a zoom lens system having the above-mentioned basic configuration like each zoom lens system according to Embodiments 1 to 7, it is preferable that the following condition (11) is satisfied.

$$0.037 < d1NG/d1G < 0.135 \tag{11}$$

where, d1NG is an optical axial center thickness of the lens element having negative optical power contained in the first lens unit, and d1G is an optical axial center thickness of the first lens unit.

The condition (11) sets forth the thickness of the lens element having negative optical power contained in the first lens unit. When the value exceeds the upper limit of the condition (11), the thickness of the entirety of the first lens unit is excessively great, and hence it is difficult to achieve a compact zoom lens system. Thus, this situation is not preferable. In contrast, when the value goes below the lower limit of the condition (11), remarkable difficulty arises in fabricating the lens element having negative optical power contained in the first lens unit. Thus, this situation is not preferable.

Here, at least one of either condition (11)' or condition (11)" and condition (11)''' is satisfied, the above-mentioned effect is achieved more successfully.

$$0.075 < d1NG/d1G \tag{11}'$$

$$0.100 < d1NG/d1G \tag{11}''$$

$$d1NG/d1G < 0.110 \tag{11}'''$$

In a zoom lens system having the above-mentioned basic configuration like each zoom lens system according to Embodiments 1 to 7, it is preferable that the following condition (12) is satisfied.

$$0.11 < f_W \cdot \tan(\omega - \omega_0) < 0.15 \tag{12}$$

where, $f_W$ is a focal length of the entire system at a wide-angle limit, $\omega$ is a half view angle (real half view angle (°)) at a wide-angle limit, and $\omega_0$ is a paraxial half view angle (°) at a wide-angle limit.

The condition (12) sets forth the difference between the real half view angle and the paraxial half view angle at a wide-angle limit. This condition substantially controls distortion. When the value falls outside the range of the condition (12), distortion is excessively great. Thus, this situation is not preferable.

Here, when at least one of the following conditions (12)' and (12)" is satisfied, the above-mentioned effect is achieved more successfully.

$$0.12 < f_W \cdot \tan(\omega - \omega_0) \tag{12}'$$

$$f_W \cdot \tan(\omega - \omega_0) < 0.14 \tag{12}''$$

In a zoom lens system having the above-mentioned basic configuration like each zoom lens system according to Embodiments 1 to 7, it is preferable that the following condition (13) is satisfied.

$$0.17 < f_4/f_T < 0.30 \tag{13}$$

where, $f_4$ is a focal length of the fourth lens unit, and $f_T$ is a focal length of the entire system at a telephoto limit.

The condition (13) sets forth the optical power of the fourth lens unit. When the value exceeds the upper limit of the condition (13), the focal length of the fourth lens unit is excessively long, that is, the optical power is excessively weak. Thus, difficulty arises in appropriately controlling the exit pupil position especially at a wide-angle limit. Accordingly, it is difficult in some cases to achieve a satisfactory image surface illuminance. In contrast, when the value goes below the lower limit of the condition (13), the focal length of the fourth lens unit is excessively short, that is, the optical power is excessively strong. Thus, it becomes difficult that large aberration generated in the fourth lens unit is compensated by other lens units. Thus, this situation is not preferable.

Here, when at least one of the following conditions (13)' and (13)" is satisfied, the above-mentioned effect is achieved more successfully.

$$0.19 < f_4/f_T \tag{13}'$$

$$f_4/f_T < 0.26 \tag{13}''$$

In a zoom lens system having the above-mentioned basic configuration like each zoom lens system according to Embodiments 1 to 7, it is preferable that the following condition (14) is satisfied.

$$0.60 < |M_1/M_2| < 1.30 \tag{14}$$

where, $M_1$ is an amount of movement of the first lens unit in the optical axis direction during zooming from a wide-angle limit to a telephoto limit (movement from the image side to the object side is defined to be positive), and $M_2$ is an amount of movement of the second lens unit in the optical axis direction during zooming from a wide-angle limit to a telephoto limit (movement from the image side to the object side is defined to be positive).

The condition (14) sets forth the amount of movement of the first lens unit in the optical axis direction. When the value exceeds the upper limit of the condition (14), the amount of movement of the first lens unit is excessively large. Thus, the effective diameter of the first lens unit necessary for achieving a satisfactory F-number at a wide-angle limit increases. This causes difficulty in some cases in achieving a compact zoom lens system. In contrast, when the value goes below the lower limit of the condition (14), the amount of movement of the second lens unit necessary for achieving a satisfactory high magnification is relatively large excessively. Thus, it is difficult in some cases to achieve a compact zoom lens system.

Here, when at least one of the following conditions (14)' and (14)" is satisfied, the above-mentioned effect is achieved more successfully.

$$0.75<|M_1/M_2| \qquad (14)'$$

$$|M_1/M_2|<1.15 \qquad (14)''$$

In a zoom lens system having the above-mentioned basic configuration like each zoom lens system according to Embodiments 1 to 7, it is preferable that the following condition (15) is satisfied.

$$0.4<|M_3/M_2|<1.2 \qquad (15)$$

where, $M_2$ is an amount of movement of the second lens unit in the optical axis direction during zooming from a wide-angle limit to a telephoto limit (movement from the image side to the object side is defined to be positive), and $M_3$ is an amount of movement of the third lens unit in the optical axis direction during zooming from a wide-angle limit to a telephoto limit (movement from the image side to the object side is defined to be positive).

The condition (15) sets forth the amount of movement of the third lens unit in the optical axis direction. When the value exceeds the upper limit of the condition (15), the amount of movement of the third lens unit is excessively large. Thus, an excessively large aberration fluctuation is generated in the third lens unit during zooming. Accordingly, it is difficult in some cases to compensate this aberration by other lens units. In contrast, when the value goes below the lower limit of the condition (15), the amount of movement of the third lens unit is excessively small. Thus, a relatively excessively large amount of movement of the second lens unit is necessary for achieving a high magnification. Accordingly, it is difficult in some cases to achieve a compact zoom lens system.

In a zoom lens system having the above-mentioned basic configuration like each zoom lens system according to Embodiments 1 to 7, it is preferable that the following condition (16) is satisfied.

$$0.35<(m_{2T}/m_{2W})/(f_T/f_W)<0.65 \qquad (16)$$

where, $m_{2T}$ is a lateral magnification of the second lens unit at a telephoto limit, $m_{2W}$ is a lateral magnification of the second lens unit at a wide-angle limit, $f_T$ is a focal length of the entire system at a telephoto limit, and $f_W$ is a focal length of the entire system at a wide-angle limit.

The condition (16) sets forth a lateral magnification change in the second lens unit and substantially sets forth the degree of variable magnification load to the second lens unit. When the value exceeds the upper limit of the condition (16), the variable magnification load to the second lens unit is excessive. Thus, it is difficult in some cases to compensate various kinds of off-axial aberration, especially, distortion at a wide-angle limit. In contrast, when the value goes below the lower limit of the condition (16), the variable magnification load to the second lens unit is excessively small. Thus, the amount of movement of the third lens unit during zooming necessary for achieving a satisfactory high magnification becomes relatively large. Accordingly, it is difficult in some cases to achieve size reduction of the entire zoom lens system.

Here, when at least one of the following conditions (16)' and (16)" is satisfied, the above-mentioned effect is achieved more successfully.

$$0.40<(m_{2T}/m_{2W})/(f_T/f_W) \qquad (16)'$$

$$(m_{2T}/m_{2W})/(f_T/f_W)<0.50 \qquad (16)''$$

In a zoom lens system having the above-mentioned basic configuration like each zoom lens system according to Embodiments 1 to 7, it is preferable that the following condition (17) is satisfied.

$$1.3<m_{3T}/m_{3W}<2.2 \qquad (17)$$

where, $m_{3T}$ is a lateral magnification of the third lens unit at a telephoto limit, and $m_{3W}$ is a lateral magnification of the third lens unit at a wide-angle limit.

The condition (17) sets forth a lateral magnification change in the third lens unit and substantially sets forth the degree of variable magnification load to the third lens unit. When the value exceeds the upper limit of the condition (17), the variable magnification load to the third lens unit is excessive. Thus, difficulty arises in compensating various kinds of aberration that vary during magnification change, especially, in compensating off-axial aberration. Thus, this situation is not preferable. In contrast, when the value goes below the lower limit of the condition (17), the variable magnification load to the third lens unit is excessively small. Thus, a relatively excessively large amount of movement of the second lens unit is necessary for achieving a high magnification. Accordingly, it is difficult in some cases to achieve a compact zoom lens system.

Here, when at least one of the following conditions (17)' and (17)" is satisfied, the above-mentioned effect is achieved more successfully.

$$1.5<m_{3T}/m_{3W} \qquad (17)'$$

$$m_{3T}/m_{3W}<2.0 \qquad (17)''$$

In a zoom lens system having the above-mentioned basic configuration like each zoom lens system according to Embodiments 1 to 7, it is preferable that the following condition (18) is satisfied.

$$5.5<\sqrt{(f_3^2+f_4^2)}/(f_W \tan \omega)<9.0 \qquad (18)$$

where,

ω is a half view angle (°) at a wide-angle limit, $f_3$ is a focal length of the third lens unit, $f_4$ is a focal length of the fourth lens unit, and $f_W$ is a focal length of the entire system at a wide-angle limit.

The condition (18) sets forth the focal lengths of the third lens unit and the fourth lens unit. When the value exceeds the upper limit of the condition (18), the focal lengths of the third lens unit and the fourth lens unit are excessively long. This causes difficulty in some cases in achieving a compact zoom lens system. In contrast, when the value goes below the lower limit of the condition (18), the focal lengths of the third lens unit and the fourth lens unit are excessively short. Thus, aberration compensation capability especially of the third lens unit is excessive. Accordingly, it is difficult in some cases to achieve satisfactory balance of aberration compensation in the entire zoom lens system.

Here, when at least one of the following conditions (18)' and (18)" is satisfied, the above-mentioned effect is achieved more successfully.

$$6.8 < \sqrt{(f_3^2 + f_4^2)}/(f_W \tan \omega) \quad (18)'$$

$$\sqrt{(f_3^2 + f_4^2)}/(f_W \tan \omega) < 7.5 \quad (18)''$$

In a zoom lens system having the above-mentioned basic configuration like each zoom lens system according to Embodiments 1 to 7, it is preferable that the following condition (19) is satisfied.

$$3.0 < (L_T - L_W)/(f_W \tan \omega) < 6.0 \quad (19)$$

where,

ω is a half view angle (°) at a wide-angle limit, $L_T$ is an overall optical axial length of the entire system at a telephoto limit (a distance from the most object side surface to the most image side surface), $L_W$ is an overall optical axial length of the entire system at a wide-angle limit (a distance from the most object side surface to the most image side surface), and $f_W$ is a focal length of the entire system at a wide-angle limit.

The condition (19) sets forth an overall length change during zooming. When the value falls outside the range of the condition (19), it is difficult to construct a compact lens barrel mechanism. Thus, this situation is not preferable.

Here, when at least one of the following conditions (19)' and (19)" is satisfied, the above-mentioned effect is achieved more successfully.

$$3.5 < (L_T - L_W)/(f_W \tan \omega) \quad (19)'$$

$$(L_T - L_W)/(f_W \tan \omega) < 4.5 \quad (19)''$$

In a zoom lens system having the above-mentioned basic configuration like each zoom lens system according to Embodiments 1 to 7, it is preferable that the following condition (20) is satisfied.

$$50 < (L_T \cdot f_T)/f_4(f_W \tan \omega) < 150 \quad (20)$$

where,

ω is a half view angle (°) at a wide-angle limit, $L_T$ is an overall optical axial length of the entire system at a telephoto limit (a distance from the most object side surface to the most image side surface), $f_4$ is a focal length of the fourth lens unit, $f_T$ is a focal length of the entire system at a telephoto limit, and $f_W$ is a focal length of the entire system at a wide-angle limit.

The condition (20) sets forth a suitable overall length at a telephoto limit. When the value exceeds the upper limit of the condition (20), the overall length at a telephoto limit is excessively long, and hence it is difficult in some cases to achieve a compact zoom lens system having a short overall length. Further, when the value exceeds the upper limit of the condition (20), the overall length at a telephoto limit is excessively long. Thus, it becomes difficult to construct a compact lens barrel mechanism. Accordingly, this situation is not preferable. In contrast, when the value goes below the lower limit of the condition (20), the focal length of the fourth lens unit is, relatively, excessively long. Thus, it becomes difficult to control the exit pupil position at a wide-angle limit. Accordingly, it becomes difficult to maintain an appropriate image surface illuminance. Thus, this situation is not preferable.

Here, when at least one of the following conditions (20)' and (20)" is satisfied, the above-mentioned effect is achieved more successfully.

$$80 < (L_T \cdot f_T)/f_4(f_W \tan \omega) \quad (20)'$$

$$(L_T \cdot f_T)/f_4(f_W \tan \omega) < 125 \quad (20)''$$

In a zoom lens system having the above-mentioned basic configuration like each zoom lens system according to Embodiments 1 to 7, it is preferable that the following condition (21) is satisfied.

$$50 < (L_W \cdot f_T)/f_4(f_W \tan \omega) < 125 \quad (21)$$

where,

ω is a half view angle (°) at a wide-angle limit, $L_W$ is an overall optical axial length of the entire system at a wide-angle limit (a distance from the most object side surface to the most image side surface), $f_4$ is a focal length of the fourth lens unit, $f_T$ is a focal length of the entire system at a telephoto limit, and $f_W$ is a focal length of the entire system at a wide-angle limit.

The condition (21) sets forth a suitable overall length at a wide-angle limit. When the value exceeds the upper limit of the condition (21), the overall length at a wide-angle limit is excessively long, and hence it is difficult in some cases to achieve a zoom lens system having a compact accommodation size. In contrast, when the value goes below the lower limit of the condition (21), the focal length of the fourth lens unit is, relatively, excessively long. Thus, it becomes difficult to control the exit pupil position at a wide-angle limit. Accordingly, it becomes difficult to maintain an appropriate image surface illuminance. Thus, this situation is not preferable.

Here, when at least one of the following conditions (21)' and (21)" is satisfied, the above-mentioned effect is achieved more successfully.

$$65 < (L_W \cdot f_T)/f_4(f_W \tan \omega) \quad (21)'$$

$$(L_W \cdot f_T)/f_4(f_W \tan \omega) < 100 \quad (21)''$$

In a zoom lens system having the above-mentioned basic configuration like each zoom lens system according to Embodiments 1 to 7, it is preferable that the following condition (22) is satisfied.

$$4.0 < f_3/f_W \tan \omega < 5.2 \quad (22)$$

where,

ω is a half view angle (°) at a wide-angle limit, $f_3$ is a focal length of the third lens unit, and $f_W$ is a focal length of the entire system at a wide-angle limit.

The condition (22) sets forth the focal length of the third lens unit. When the value exceeds the upper limit of the condition (22), the focal length of the third lens unit is excessively long. This causes difficulty in some cases in achieving a compact zoom lens system. Further, when the value exceeds the upper limit of the condition (22), the necessary amount of movement in a case that, for example, the third lens unit is moved in a direction perpendicular to the optical axis for blur compensation becomes excessively large. Thus, this situation is not preferable. In contrast, when the value goes below the lower limit of the condition (22), the focal length of the third lens unit is excessively short. Thus, the aberration compensation capability of the third lens unit is excessive, and hence the compensation balance of various kinds of aberration is degraded. This causes difficulty in some cases in achieving a compact zoom lens system.

Here, when at least one of the following conditions (22)' and (22)" is satisfied, the above-mentioned effect is achieved more successfully.

$$4.4 < f_3/f_W \cdot \tan \omega \quad (22)'$$

$$f_3/f_W \cdot \tan \omega < 4.8 \quad (22)''$$

Here, the lens units constituting the zoom lens system of each embodiment are composed exclusively of refractive type lenses that deflect the incident light by refraction (that is, lenses of a type in which deflection is achieved at the interface between media each having a distinct refractive index). However, the lens type is not limited to this. For example, the lens units may employ diffractive type lenses that deflect the incident light by diffraction; refractive-diffractive hybrid type lenses that deflect the incident light by a combination of diffraction and refraction; or gradient index type lenses that deflect the incident light by distribution of refractive index in the medium.

Further, in each embodiment, a reflecting surface may be arranged in the optical path so that the optical path may be bent before, after or in the middle of the zoom lens system. The bending position may be set up in accordance with the necessity. When the optical path is bent appropriately, the apparent thickness of a camera can be reduced.

Moreover, each embodiment has been described for the case that a plane parallel plate such as an optical low-pass filter is arranged between the last surface of the zoom lens system (the most image side surface of the fourth lens unit) and the image surface S. This low-pass filter may be: a birefringent type low-pass filter made of, for example, a crystal whose predetermined crystal orientation is adjusted; or a phase type low-pass filter that achieves required characteristics of optical cut-off frequency by diffraction.

(Embodiment 8)

Figure 22:
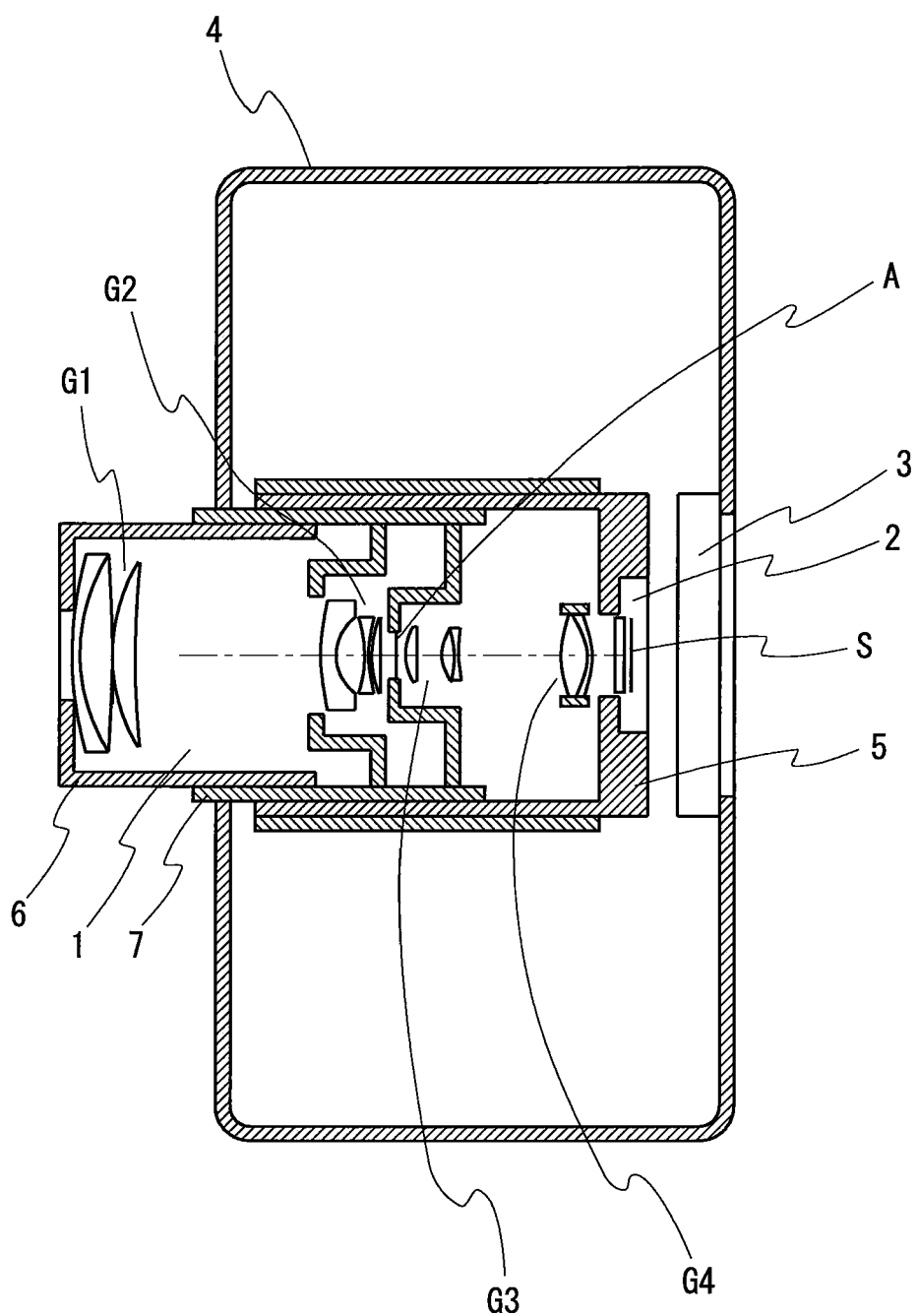
FIG. 22 is a schematic construction diagram of a digital still camera according to Embodiment 8.

FIG. 22 is a schematic construction diagram of a digital still camera according to Embodiment 8. In FIG. 22, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment 1. In FIG. 22, the zoom lens system 1 comprises a first lens unit G1, a second lens unit G2, a diaphragm A, a third lens unit G3 and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the third lens unit G3 and the fourth lens unit G4 move to predetermined positions relative to the image sensor 2, so that magnification change can be achieved ranging from a wide-angle limit to a telephoto limit. The fourth lens unit G4 is movable in an optical axis direction by a motor for focus adjustment.

As such, when the zoom lens system according to Embodiment 1 is employed in a digital still camera, a small digital still camera is obtained that has a high resolution and high capability of compensating the curvature of field and that has a short overall optical length of lens system at the time of non-use. Here, in the digital still camera shown in FIG. 22, any one of the zoom lens systems according to Embodiments 2 to 7 may be employed in place of the zoom lens system according to Embodiment 1. Further, the optical system of the digital still camera shown in FIG. 22 is applicable also to a digital video camera for moving images. In this case, moving images with high resolution can be acquired in addition to still images.

Further, an imaging device comprising a zoom lens system according to Embodiments 1 to 7 described above and an image sensor such as a CCD or a CMOS may be applied to a mobile telephone, a PDA (Personal Digital Assistance), a surveillance camera in a surveillance system, a Web camera, a vehicle-mounted camera or the like.

Numerical examples are described below in which the zoom lens systems according to Embodiments 1 to 7 are implemented. In the numerical examples, the units of the length in the tables are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression.

$$Z = \frac{h^2/r}{1 + \sqrt{1 - (1+\kappa)(h/r)^2}} + A4h^4 + A6h^6 + A8h^8 + A10h^{10}$$

Here, κ is the conic constant, and A4, A6, A8 and A10 are a fourth-order, sixth-order, eighth-order and tenth-order aspherical coefficients, respectively.

Figure 2:
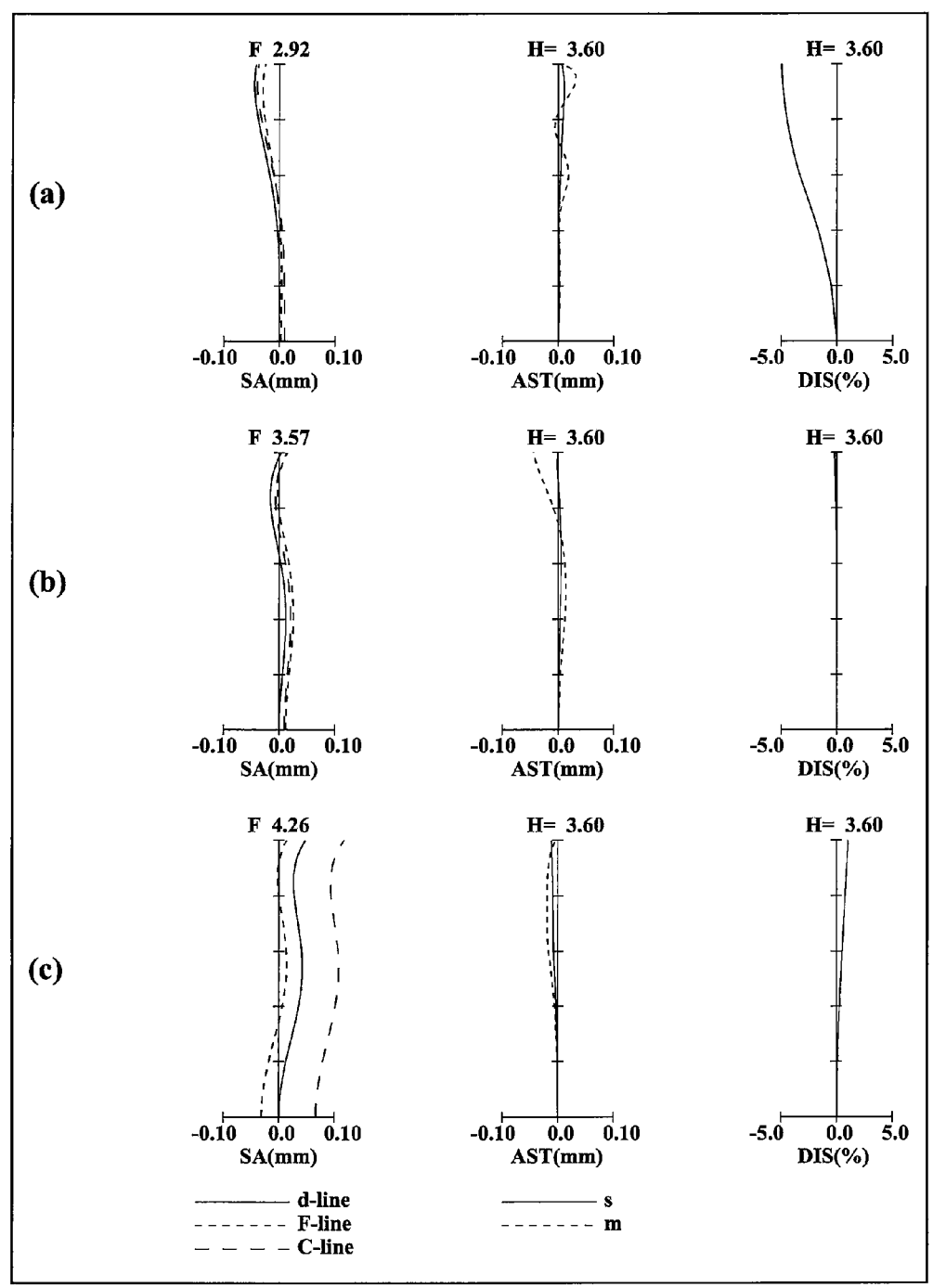
FIG. 2 is a longitudinal aberration diagram of an infinity in-focus condition of a zoom lens system according to Example 1.
Figure 5:
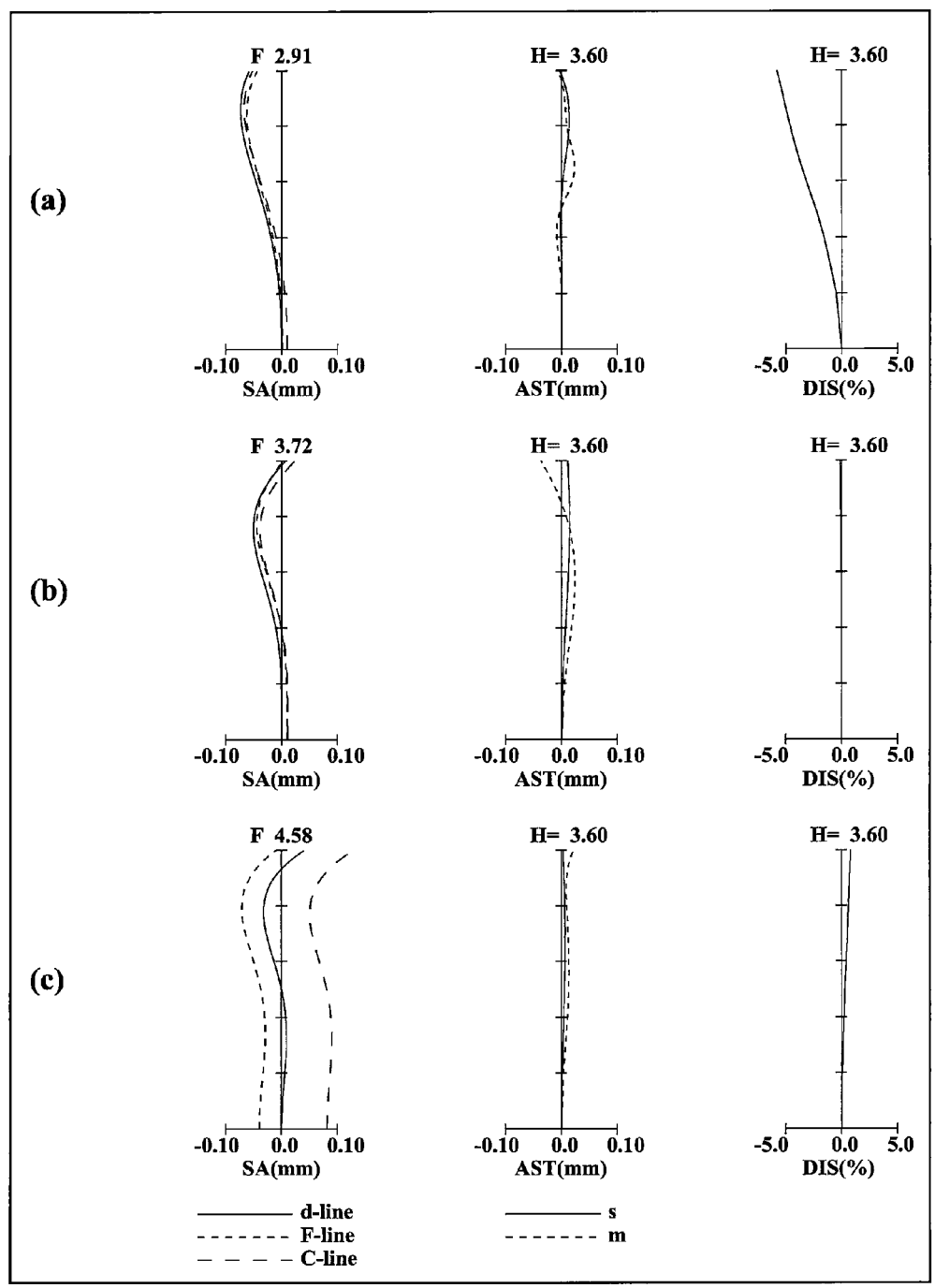
FIG. 5 is a longitudinal aberration diagram of an infinity in-focus condition of a zoom lens system according to Example 2.
Figure 8:
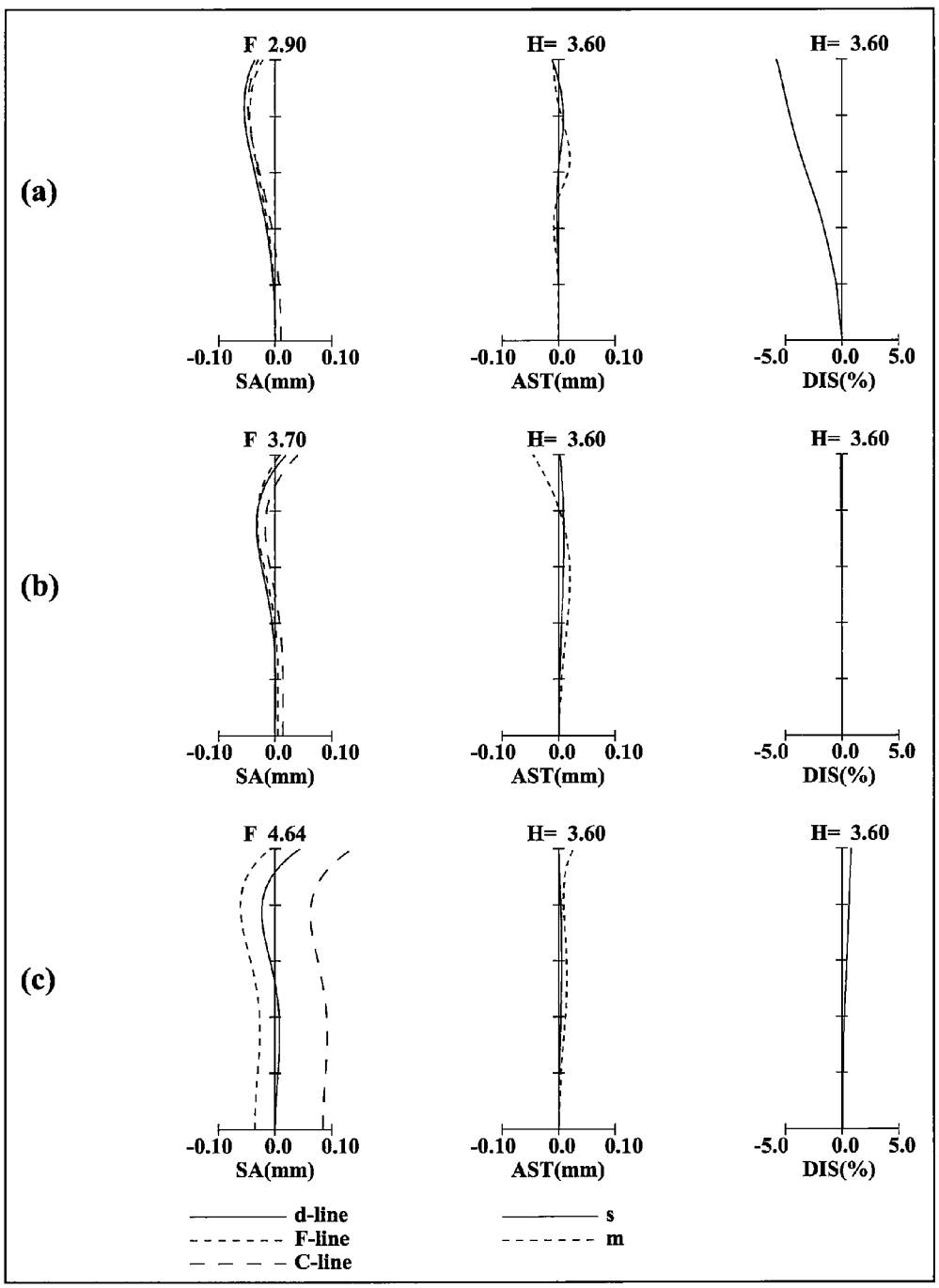
FIG. 8 is a longitudinal aberration diagram of an infinity in-focus condition of a zoom lens system according to Example 3.
Figure 11:
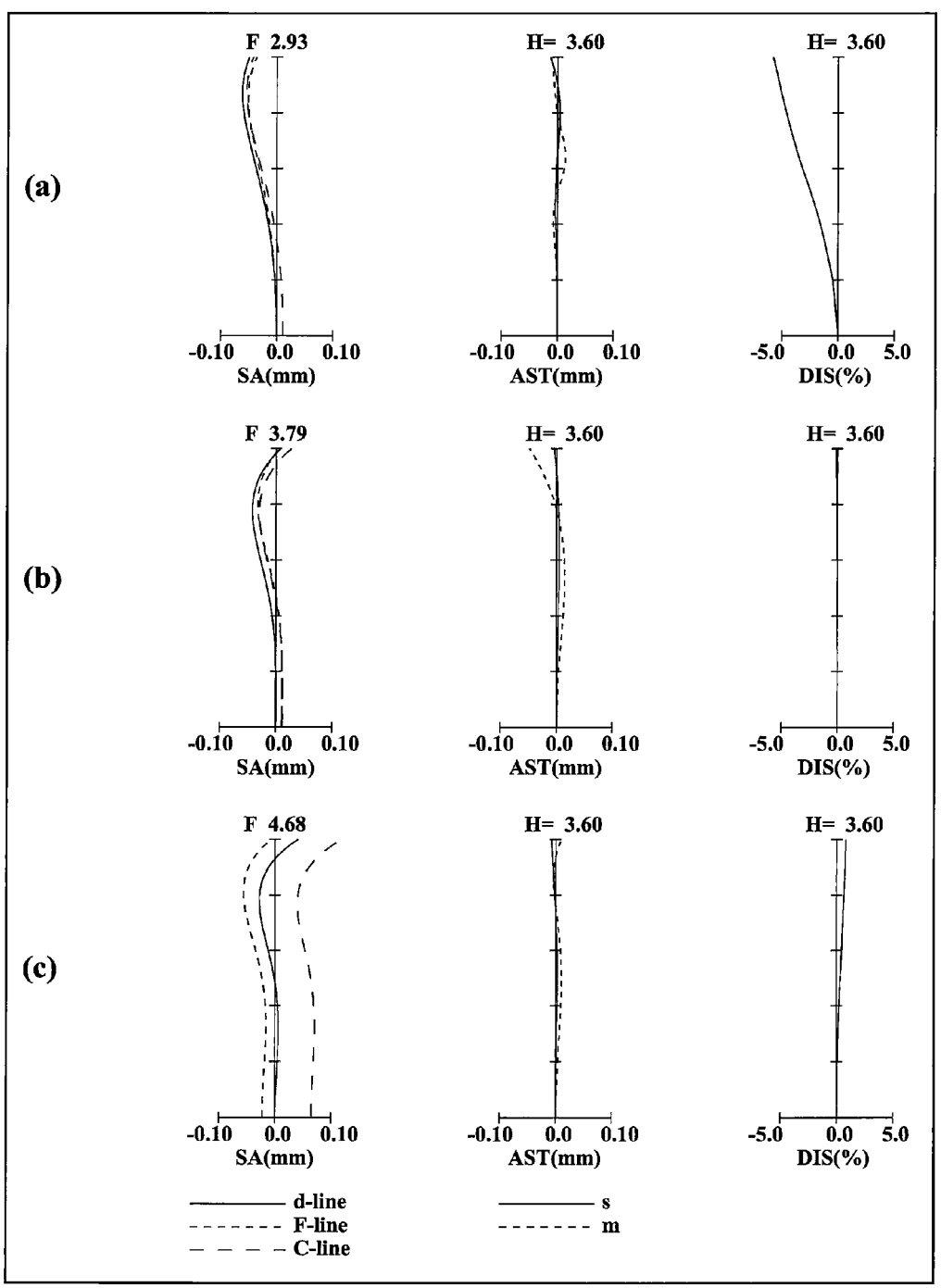
FIG. 11 is a longitudinal aberration diagram of an infinity in-focus condition of a zoom lens system according to Example 4.
Figure 14:
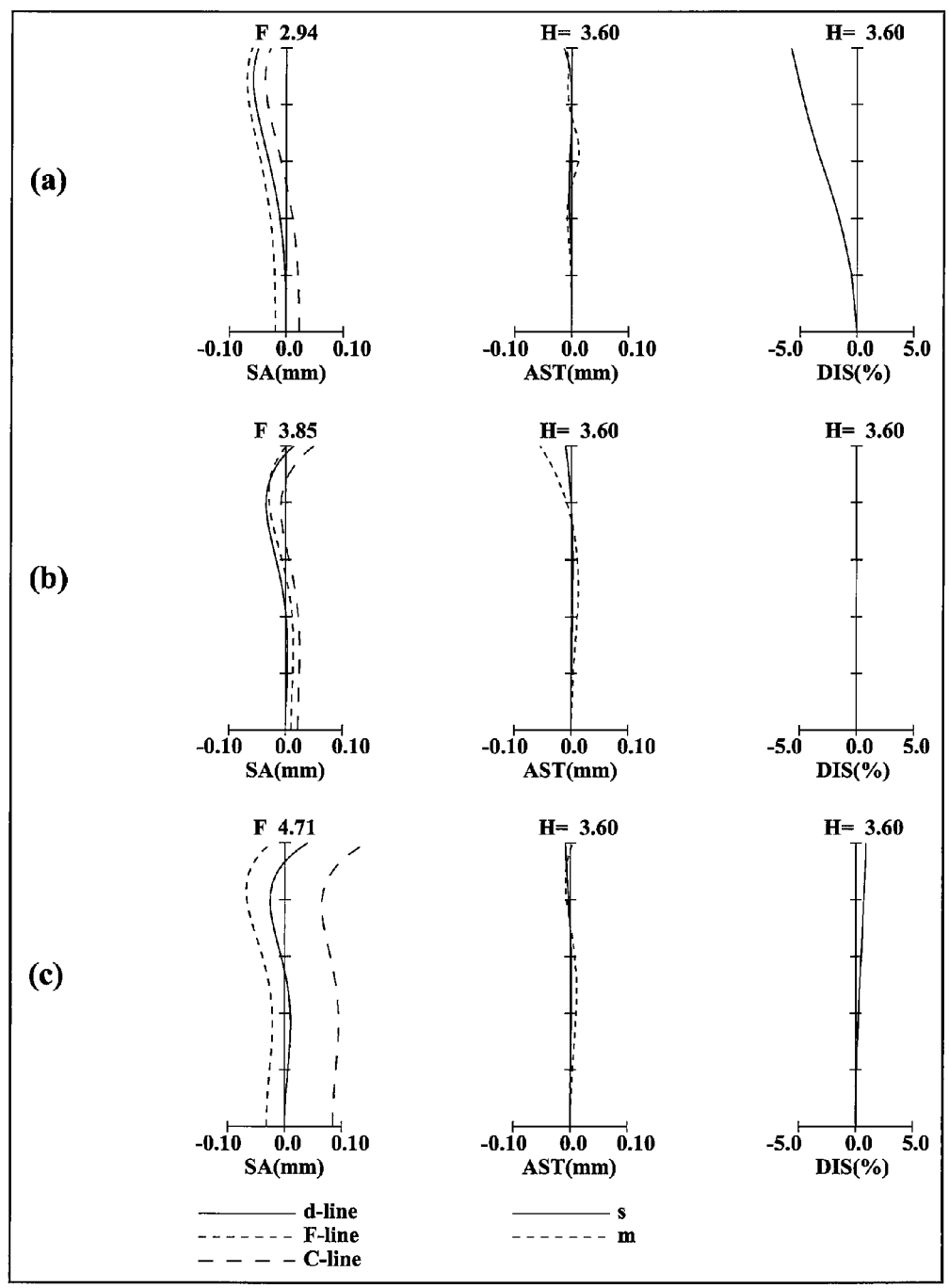
FIG. 14 is a longitudinal aberration diagram of an infinity in-focus condition of a zoom lens system according to Example 5.
Figure 17:
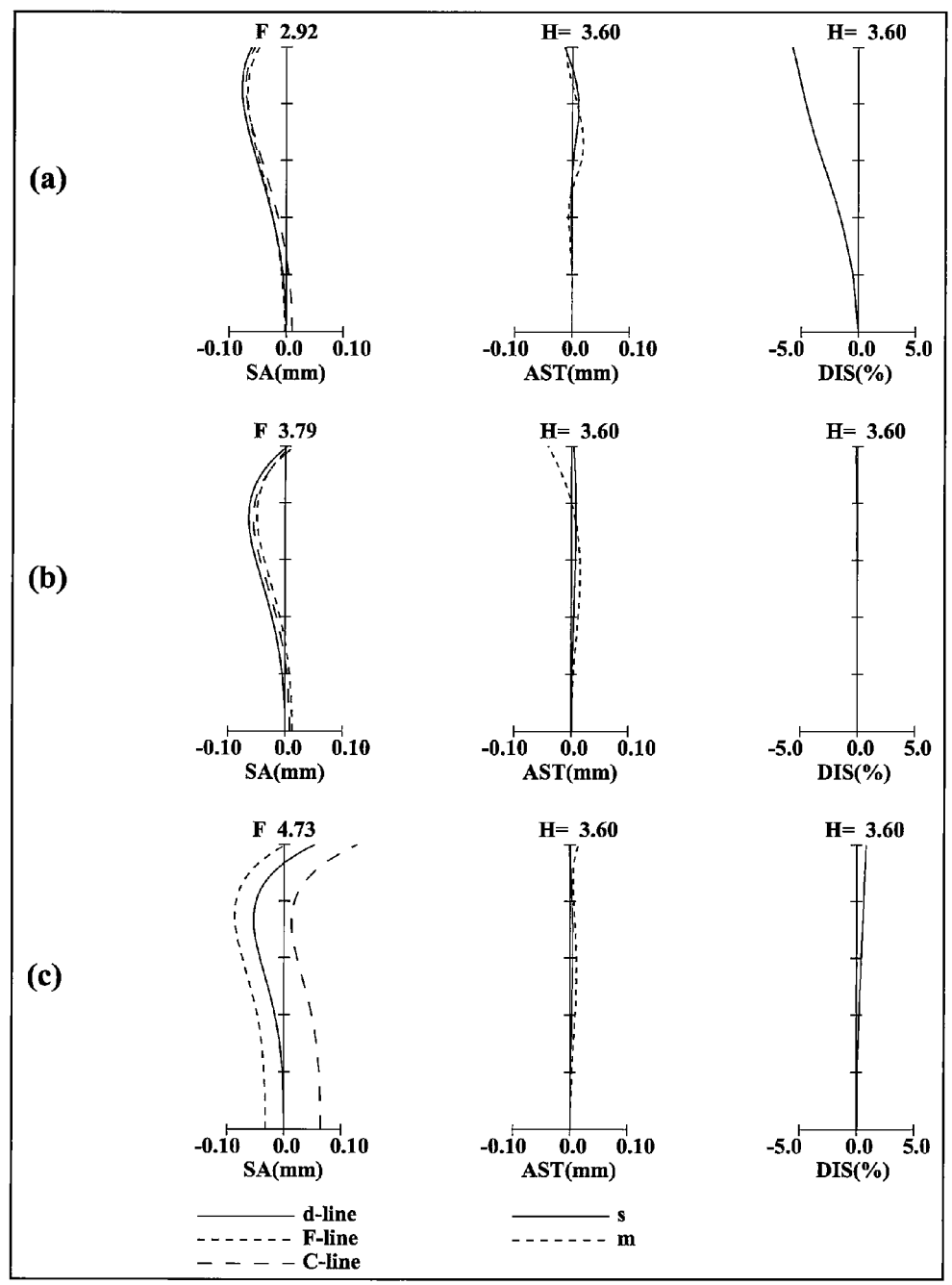
FIG. 17 is a longitudinal aberration diagram of an infinity in-focus condition of a zoom lens system according to Example 6.
Figure 20:
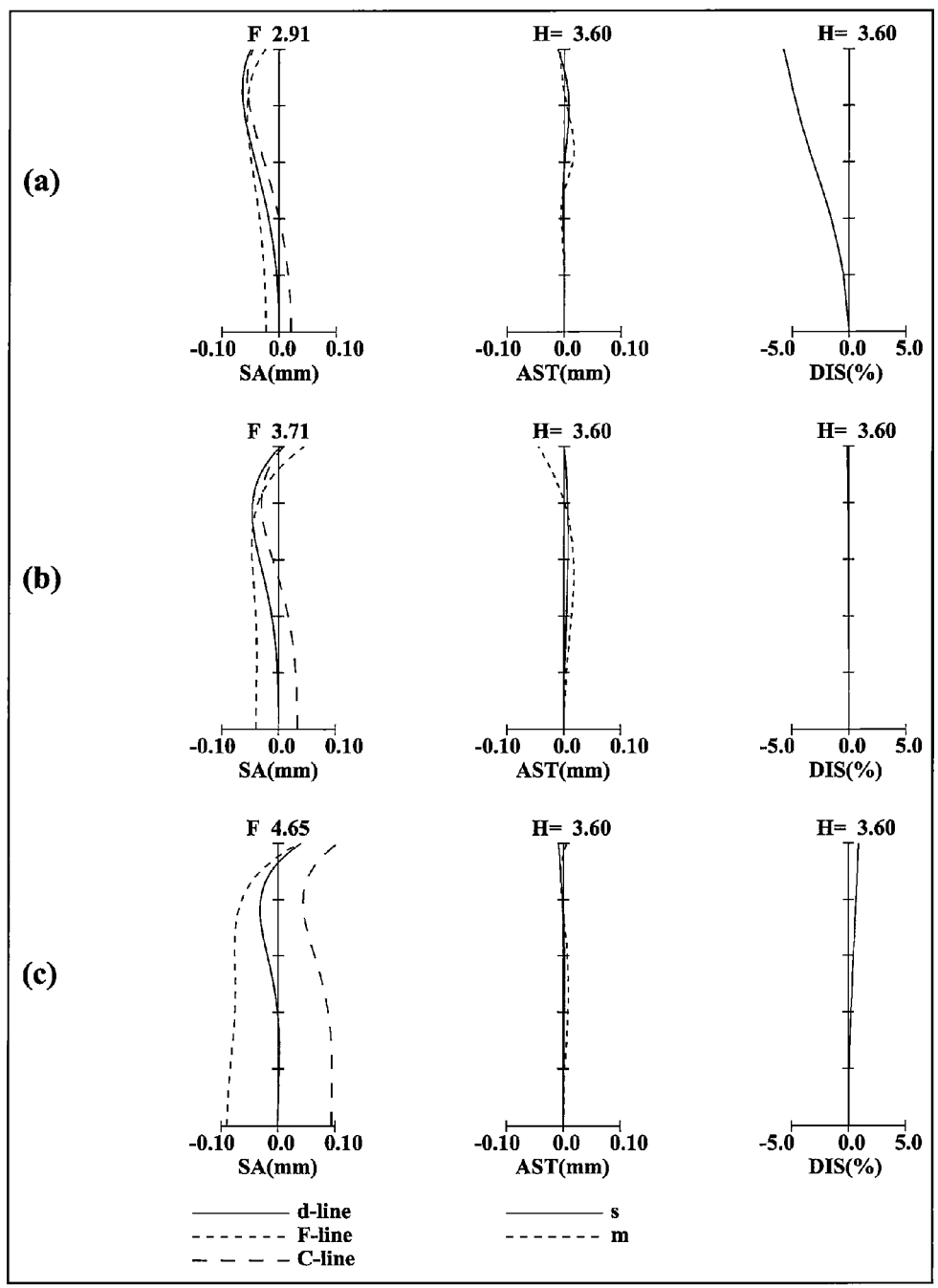
FIG. 20 is a longitudinal aberration diagram of an infinity in-focus condition of a zoom lens system according to Example 7.

FIG. 2 is a longitudinal aberration diagram of a zoom lens system according to Example 1. FIG. 5 is a longitudinal aberration diagram of a zoom lens system according to Example 2. FIG. 8 is a longitudinal aberration diagram of a zoom lens system according to Example 3. FIG. 11 is a longitudinal aberration diagram of a zoom lens system according to Example 4. FIG. 14 is a longitudinal aberration diagram of a zoom lens system according to Example 5. FIG. 17 is a longitudinal aberration diagram of a zoom lens system according to Example 6. FIG. 20 is a longitudinal aberration diagram of a zoom lens system according to Example 7.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each FIG., indicated as F), and the solid line, the short dash line and the long dash line indicate the characteristics to the d-line, the F-line and the C-line, respectively. In each astigmatism diagram, the vertical axis indicates the image height (in each FIG., indicated as H), and the solid line and the dash line indicate the characteristics to the sagittal plane (in each FIG., indicated as "s") and the meridional plane (in each FIG., indicated as "m"), respectively. In each distortion diagram, the vertical axis indicates the image height (in each FIG., indicated as H).

Figure 3:
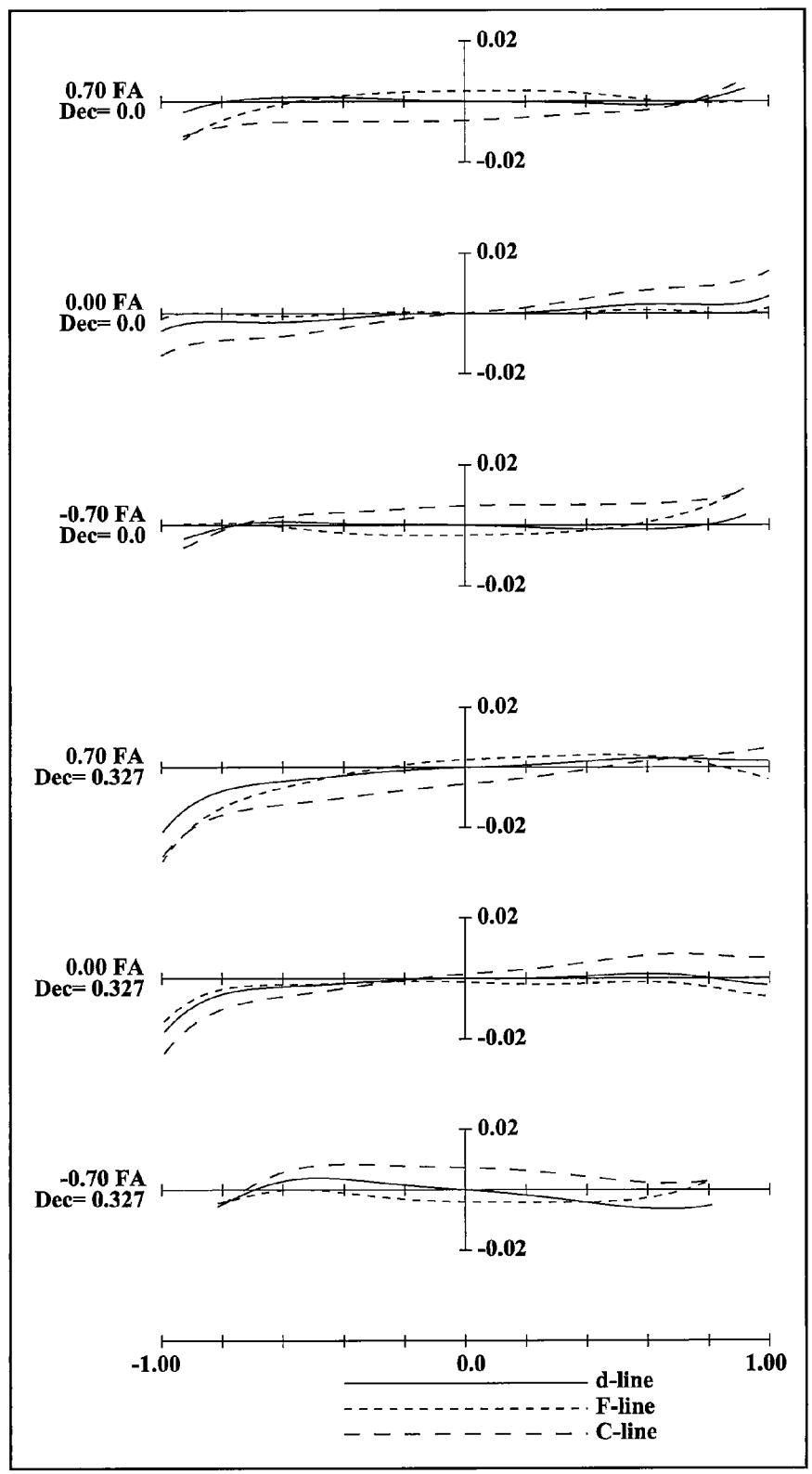
FIG. 3 is a lateral aberration diagram in a basic state where image blur compensation is not performed and in an image blur compensation state at a telephoto limit of a zoom lens system according to Example 1.
Figure 6:
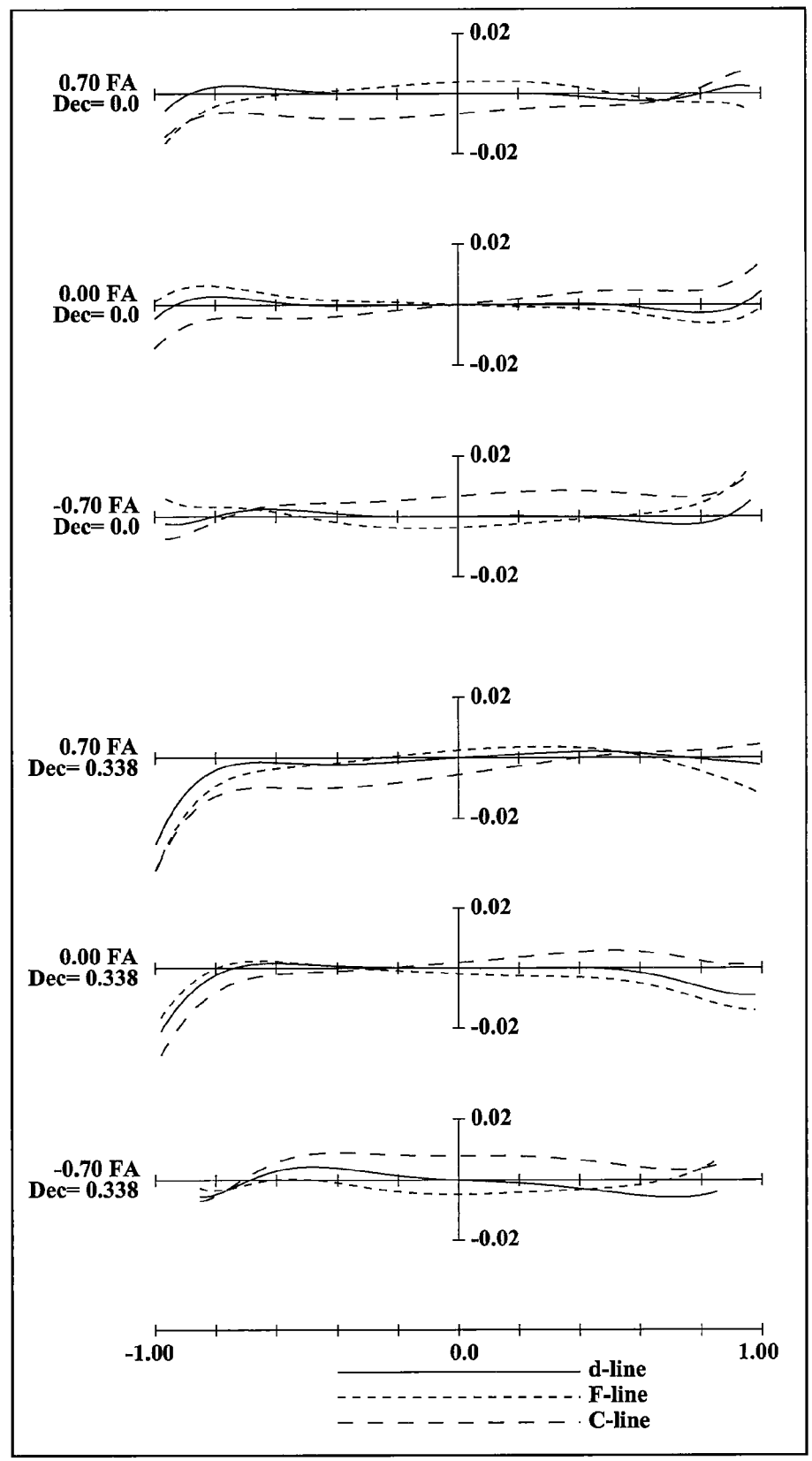
FIG. 6 is a lateral aberration diagram in a basic state where image blur compensation is not performed and in an image blur compensation state at a telephoto limit of a zoom lens system according to Example 2.
Figure 9:
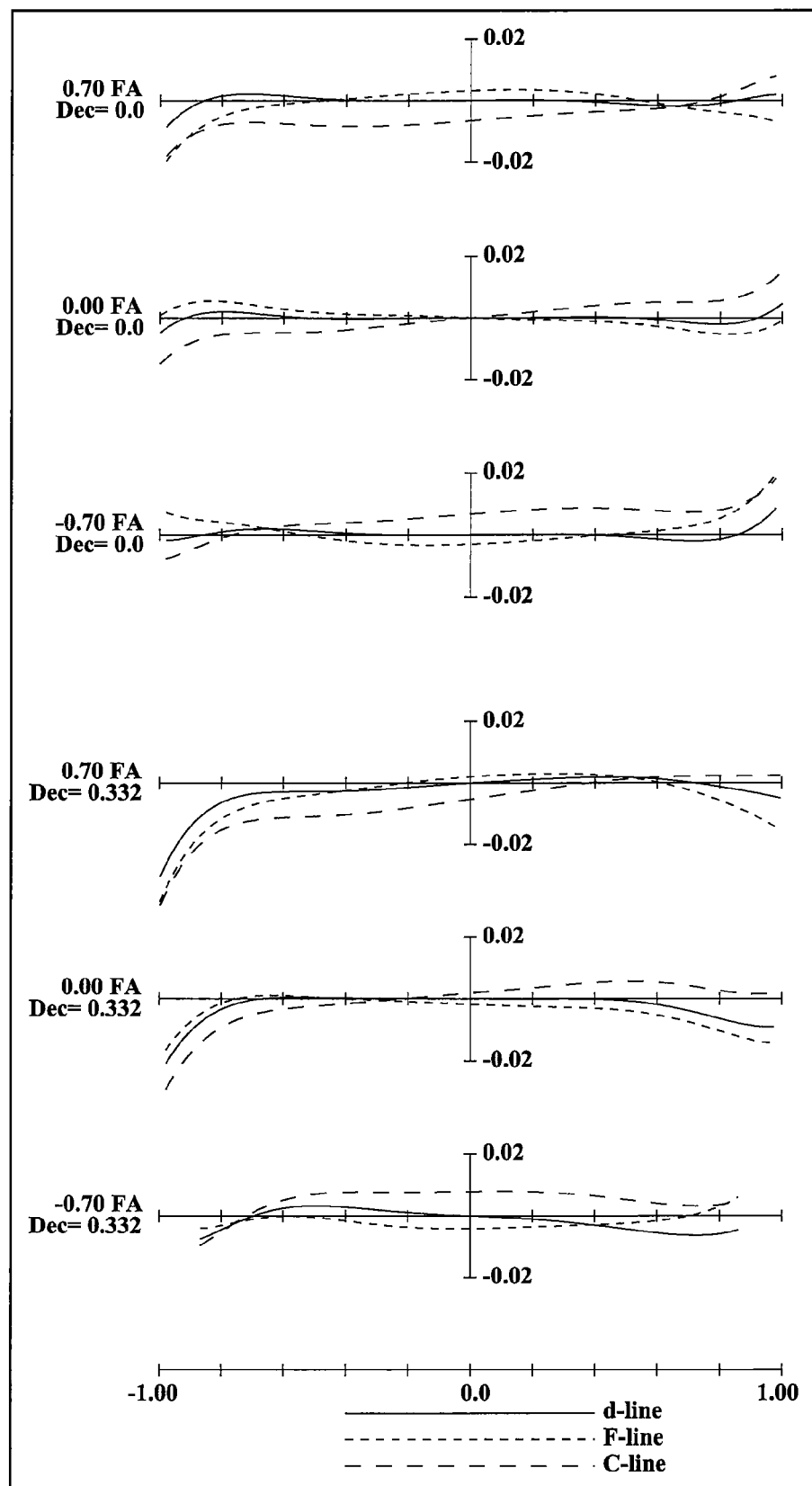
FIG. 9 is a lateral aberration diagram in a basic state where image blur compensation is not performed and in an image blur compensation state at a telephoto limit of a zoom lens system according to Example 3.
Figure 12:
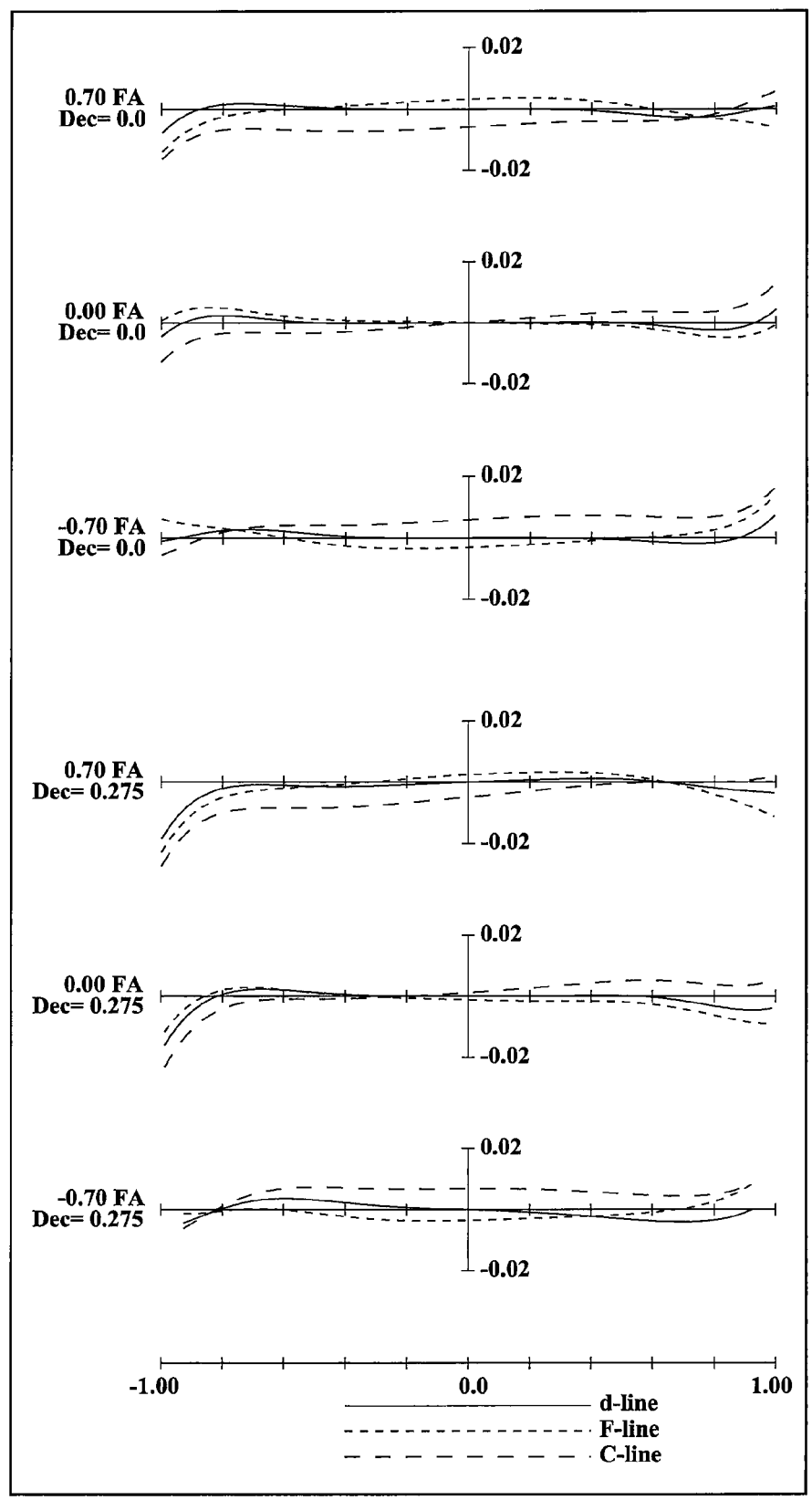
FIG. 12 is a lateral aberration diagram in a basic state where image blur compensation is not performed and in an image blur compensation state at a telephoto limit of a zoom lens system according to Example 4.
Figure 15:
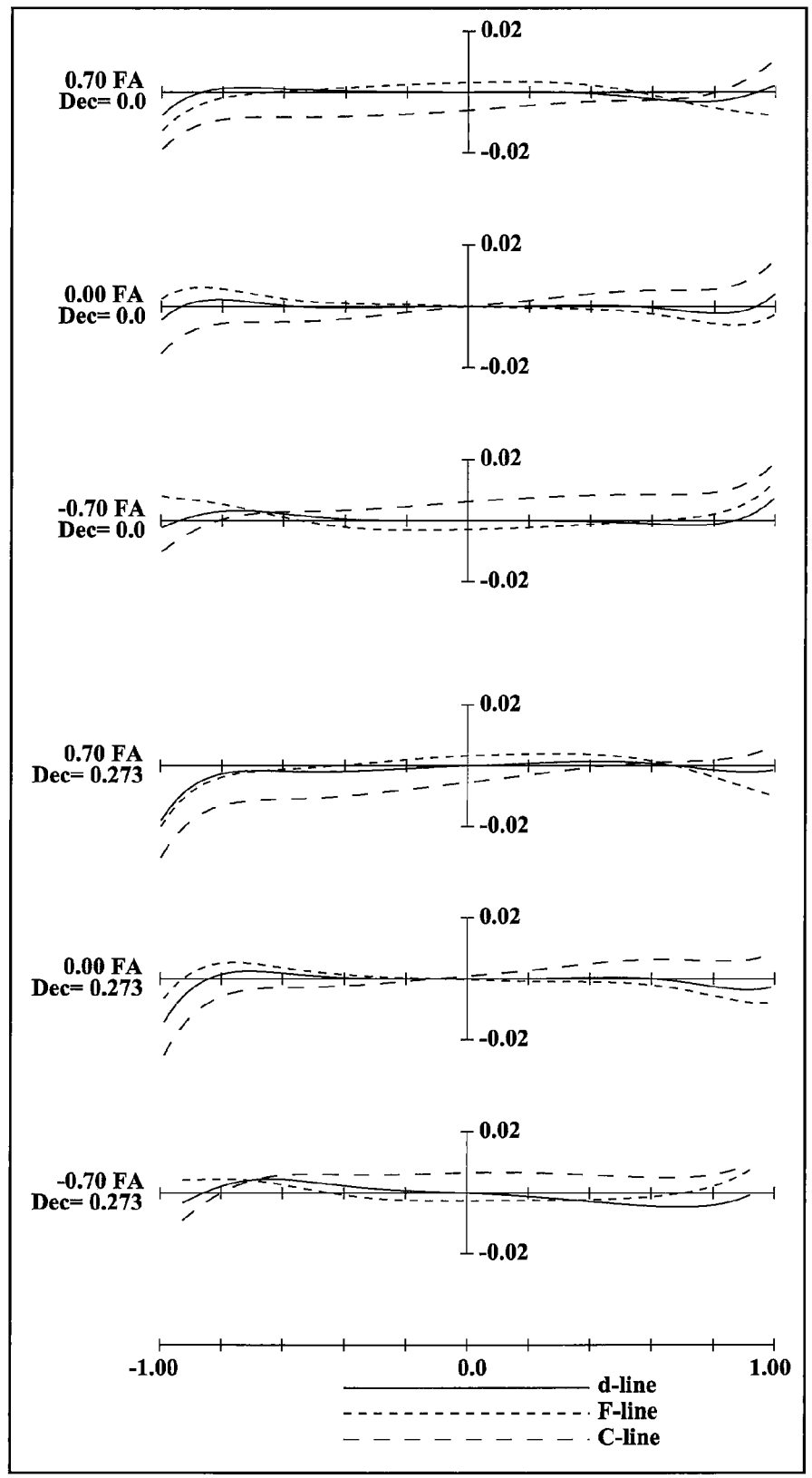
FIG. 15 is a lateral aberration diagram in a basic state where image blur compensation is not performed and in an image blur compensation state at a telephoto limit of a zoom lens system according to Example 5.
Figure 18:
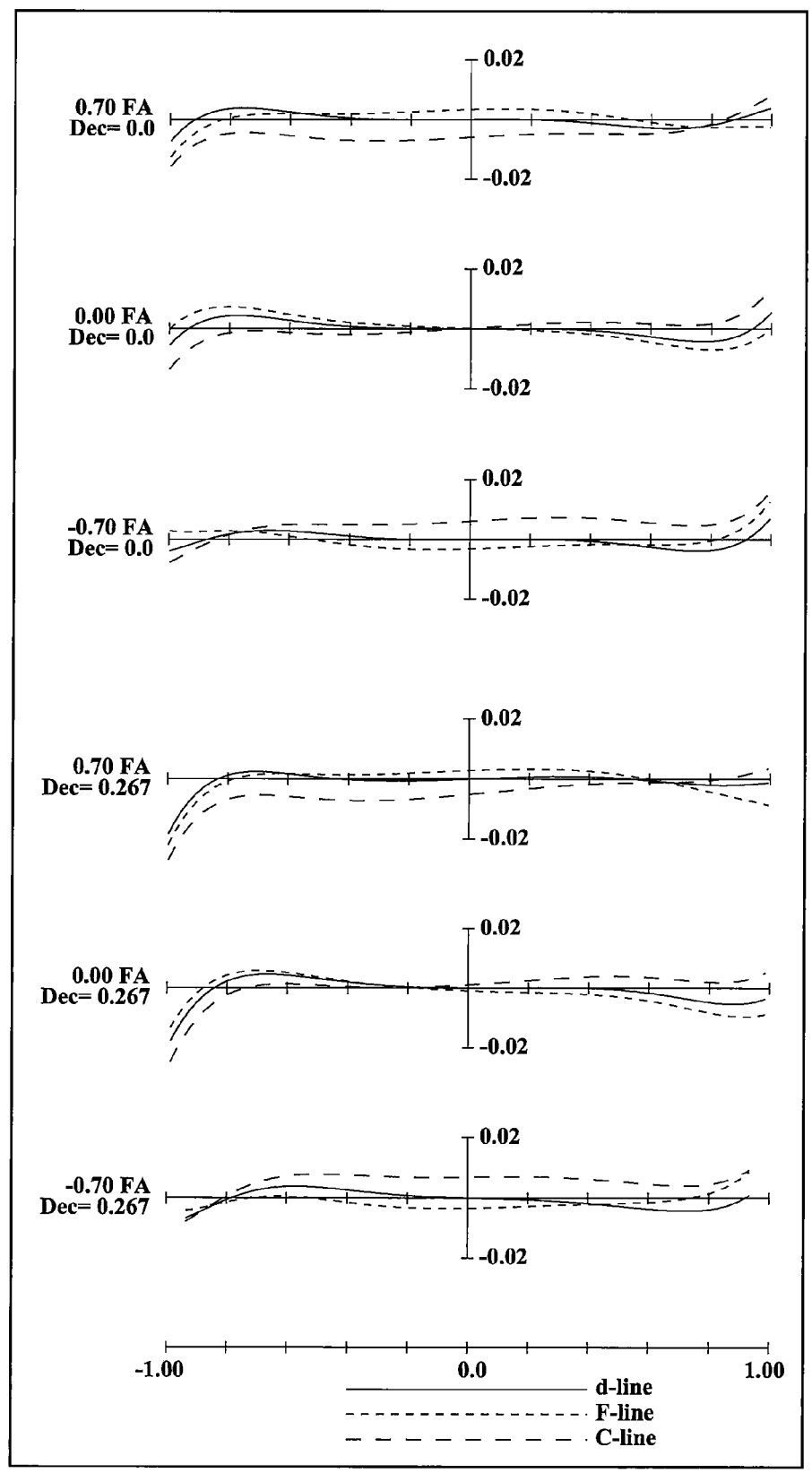
FIG. 18 is a lateral aberration diagram in a basic state where image blur compensation is not performed and in an image blur compensation state at a telephoto limit of a zoom lens system according to Example 6.
Figure 21:
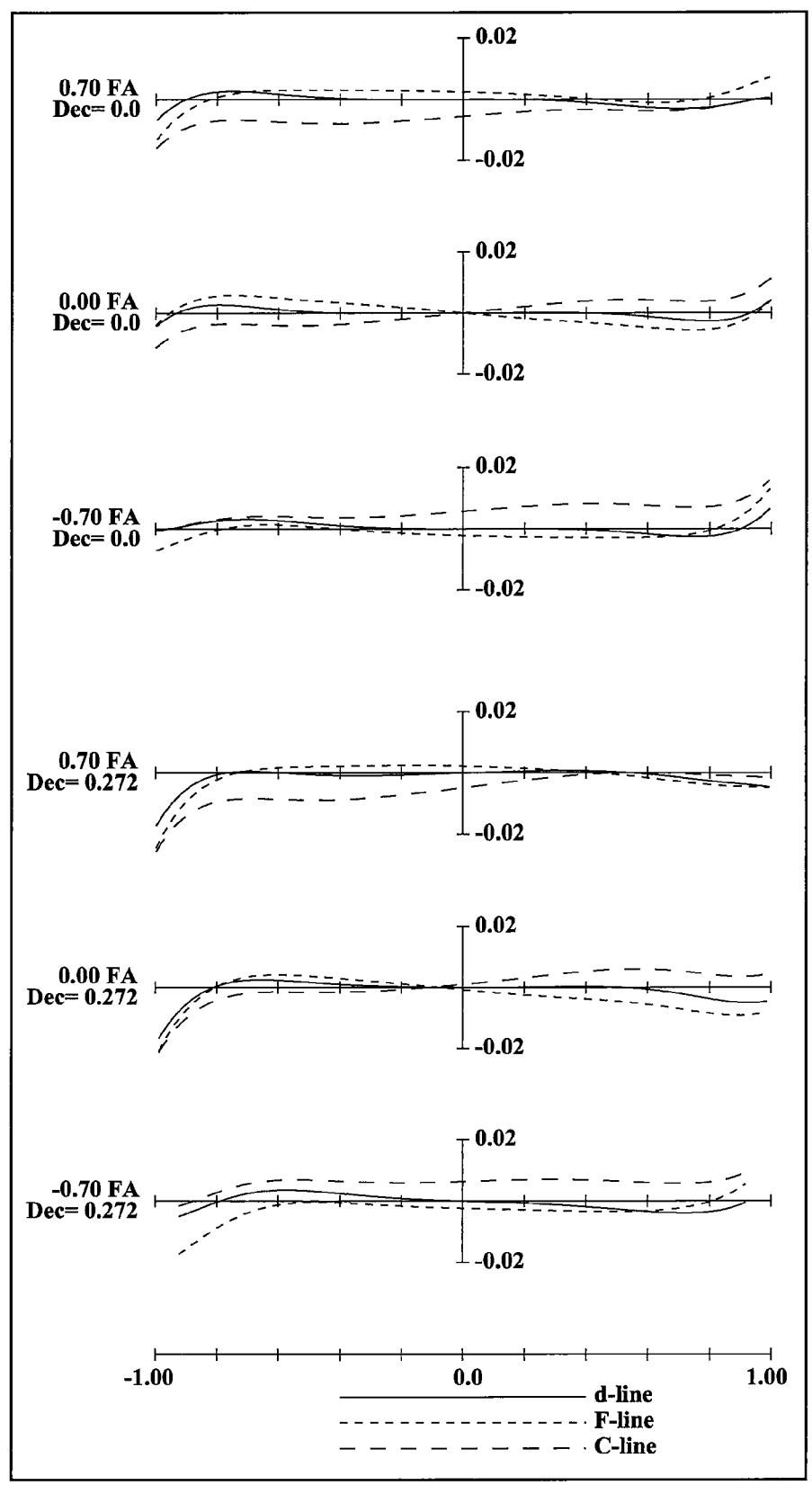
FIG. 21 is a lateral aberration diagram in a basic state where image blur compensation is not performed and in an image blur compensation state at a telephoto limit of a zoom lens system according to Example 7.

Further, FIG. 3 is a lateral aberration diagram at a telephoto limit of a zoom lens system according to Example 1. FIG. 6 is a lateral aberration diagram at a telephoto limit of a zoom lens system according to Example 2. FIG. 9 is a lateral aberration diagram at a telephoto limit of a zoom lens system according to Example 3. FIG. 12 is a lateral aberration diagram at a telephoto limit of a zoom lens system according to Example 4. FIG. 15 is a lateral aberration diagram at a telephoto limit of a zoom lens system according to Example 5. FIG. 18 is a lateral aberration diagram at a telephoto limit of a zoom lens system according to Example 6. FIG. 21 is a lateral aberration diagram at a telephoto limit of a zoom lens system according to Example 7.

In each lateral aberration diagram, the upper three aberration diagrams correspond to a basic state where image blur compensation is not performed at a telephoto limit, while the lower three aberration diagrams correspond to an image blur compensation state where the entire third lens unit G3 is moved by a predetermined amount in a direction perpendicular to the optical axis at a telephoto limit. Among the lateral aberration diagrams of the basic state, the upper one shows the lateral aberration at an image point of 70% of the maximum image height, the middle one shows the lateral aberration at the axial image point, and the lower one shows the lateral aberration at an image point of −70% of the maximum image height. Among the lateral aberration diagrams of an image blur compensation state, the upper one shows the lateral aberration at an image point of 70% of the maximum image height, the middle one shows the lateral aberration at the axial image point, and the lower one shows the lateral aberration at an image point of −70% of the maximum image height. In each lateral aberration diagram, the horizontal axis indicates the distance from the principal ray on the pupil surface. The solid line indicates the characteristics to the d-line, the short dash line indicates the characteristics to the F-line, and the long dash line indicates the characteristics to the C-line. In each lateral aberration diagram, the meridional plane is adopted as the plane containing the optical axis of the first lens unit G1 and the optical axis of the third lens unit G3.

Here, the amount of movement of the third lens unit G3 in a direction perpendicular to the optical axis in the image blur compensation state at a telephoto limit is 0.32659 mm in Example 1, 0.33785 mm in Example 2, 0.33231 mm in Example 3, 0.27464 mm in Example 4, 0.27282 mm in Example 5, 0.26747 mm in Example 6, and 0.27200 mm in Example 7. Here, when the shooting distance is infinity, at a telephoto limit, the amount of image decentering in a case that the zoom lens system inclines by 0.3° is equal to the amount of image decentering in a case that the entire third lens unit G3 displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

NUMERICAL EXAMPLE 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data.

TABLE 1

(Surface data)

| Surface number | r | d | nd | vd |
|---|---|---|---|---|
| Object surface | ∞ | ∞ | | |
| 1 | 57.95131 | 1.15000 | 1.84666 | 23.8 |
| 2 | 35.22252 | 5.33100 | 1.49700 | 81.6 |
| 3 | −329.03920 | 0.15000 | | |
| 4 | 30.25473 | 3.40000 | 1.72916 | 54.7 |
| 5 | 74.29786 | Variable | | |
| 6* | 86.76676 | 1.40000 | 1.80470 | 41.0 |
| 7* | 7.17138 | 4.15300 | | |
| 8 | −28.12858 | 0.80000 | 1.77250 | 49.6 |
| 9 | 14.93200 | 0.80170 | | |
| 10 | 15.09606 | 2.10000 | 1.92286 | 20.9 |
| 11 | 448.35890 | Variable | | |
| 12(Diaphragm) | ∞ | 1.20000 | | |
| 13 | 6.83784 | 2.00000 | 1.49700 | 81.6 |
| 14 | 92.77361 | 2.60000 | | |
| 15* | 12.04701 | 1.70000 | 1.74993 | 45.4 |
| 16 | −11.68449 | 0.45000 | 1.80610 | 33.3 |
| 17 | 8.69889 | Variable | | |
| 18* | 15.03761 | 2.90000 | 1.60602 | 57.4 |
| 19 | −11.34538 | 0.55000 | 1.68893 | 31.2 |
| 20 | −43.35350 | Variable | | |
| 21 | ∞ | 0.90000 | 1.51633 | 64.0 |
| 22 | ∞ | (BF) | | |
| Image surface | ∞ | | | |

TABLE 2

(Aspherical data)

Surface No. 6

K = 0.00000E+00, A4 = 3.19861E−07, A6 = 1.19643E−06,
A8 = −1.99492E−08 A10 = 9.22946E−11

Surface No. 7

K = 0.00000E+00, A4 = −2.80307E−05, A6 = −2.50610E−06,
A8 = 2.50202E−07 A10 = −5.28542E−09

Surface No. 15

K = 0.00000E+00, A4 = −4.71331E−04, A6 = −5.18201E−06,
A8 = −8.11898E−07 A10 = 1.27773E−08

Surface No. 18

K = 0.00000E+00, A4 = −1.57275E−05, A6 = 1.25521E−06,
A8 = −1.76417E−08 A10 = 0.00000E+00

TABLE 3

(Various data)
Zooming ratio 17.38990

| | Wide-angle limit | Middle position | Telephoto limit |
|---|---|---|---|
| Focal length | 4.7510 | 30.0025 | 82.6202 |
| F-number | 2.92486 | 3.57246 | 4.25648 |
| View angle | 38.5676 | 6.8579 | 2.4697 |
| Image height | 3.6000 | 3.6000 | 3.6000 |
| Overall length of lens system | 72.9133 | 80.7264 | 88.8801 |
| BF | 0.89591 | 0.87002 | 0.84415 |
| d5 | 0.6000 | 23.5768 | 31.3391 |
| d11 | 27.7961 | 5.1165 | 2.1000 |
| d17 | 5.4844 | 6.8655 | 18.4089 |
| d20 | 6.5511 | 12.7118 | 4.6022 |

TABLE 3-continued (Various data)
Zooming ratio 17.38990

|  | Wide-angle limit | Middle position | Telephoto limit |
|---|---|---|---|
| Entrance pupil position | 18.8911 | 112.1338 | 261.2258 |
| Exit pupil position | −30.9199 | −43.8672 | 166.8483 |
| Front principal points position | 22.9327 | 122.0154 | 384.9660 |
| Back principal points position | 68.1622 | 50.7238 | 6.2599 |

NUMERICAL EXAMPLE 2

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows various data.

TABLE 4

(Surface data)

| Surface number | r | d | nd | vd |
|---|---|---|---|---|
| Object surface | ∞ | ∞ | | |
| 1 | 54.95769 | 1.15000 | 1.84666 | 23.8 |
| 2 | 33.68335 | 5.33100 | 1.49700 | 81.6 |
| 3 | −358.26960 | 0.15000 | | |
| 4 | 29.22272 | 3.40000 | 1.72916 | 54.7 |
| 5 | 71.95118 | Variable | | |
| 6* | 200.99950 | 1.40000 | 1.80470 | 41.0 |
| 7* | 7.36029 | 4.00000 | | |
| 8 | −33.58337 | 0.80000 | 1.77250 | 49.6 |
| 9 | 13.29976 | 0.69390 | | |
| 10 | 13.65144 | 2.10000 | 1.92286 | 20.9 |
| 11 | 162.11920 | Variable | | |
| 12(Diaphragm) | ∞ | 1.20000 | | |
| 13 | 6.66982 | 2.00000 | 1.49700 | 81.6 |
| 14 | 75.59153 | 2.60000 | | |
| 15* | 13.37576 | 1.70000 | 1.74993 | 45.4 |
| 16 | −11.69083 | 0.45000 | 1.80610 | 33.3 |
| 17 | 9.13583 | Variable | | |
| 18* | 16.30295 | 2.90000 | 1.60602 | 57.4 |
| 19 | −12.50230 | 0.55000 | 1.68893 | 31.2 |
| 20 | −38.77835 | Variable | | |
| 21 | ∞ | 0.90000 | 1.51633 | 64.0 |
| 22 | ∞ | (BF) | | |
| Image surface | ∞ | | | |

TABLE 5

(Aspherical data)

Surface No. 6

K = 0.00000E+00, A4 = 7.79768E−05, A6 = −2.12141E−07,
A8 = −7.61782E−09 A10 = 4.77942E−11

Surface No. 7

K = 0.00000E+00, A4 = 6.66509E−05, A6 = −2.93266E−06,
A8 = 2.74874E−07 A10 = −5.69183E−09

Surface No. 15

K = 0.00000E+00, A4 = −4.94612E−04, A6 = −7.34009E−06,
A8 = −9.58053E−07 A10 = 2.36960E−08

Surface No. 18

K = 0.00000E+00, A4 = −1.70925E−05, A6 = 1.22307E−06,
A8 = −1.87306E−08 A10 = 0.00000E+00

TABLE 6

(Various data)
Zooming ratio 19.30843

|  | Wide-angle limit | Middle position | Telephoto limit |
|---|---|---|---|
| Focal length | 4.7492 | 30.0052 | 91.6997 |
| F-number | 2.90658 | 3.72119 | 4.58238 |
| View angle | 38.8247 | 6.8503 | 2.2304 |
| Image height | 3.6000 | 3.6000 | 3.6000 |
| Overall length of lens system | 72.9618 | 79.7551 | 90.0796 |
| BF | 0.92610 | 0.90181 | 0.89690 |
| d5 | 0.6000 | 21.4792 | 30.0457 |
| d11 | 28.1807 | 4.9031 | 2.1000 |
| d17 | 4.5971 | 6.3517 | 21.1363 |
| d20 | 7.3330 | 14.7944 | 4.5758 |
| Entrance pupil position | 18.8931 | 97.6963 | 253.4224 |
| Exit pupil position | −28.2798 | −43.1524 | 97.4921 |
| Front principal points position | 22.8701 | 107.2651 | 432.1745 |
| Back principal points position | 68.2126 | 49.7499 | −1.6201 |

NUMERICAL EXAMPLE 3

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows various data.

TABLE 7

(Surface data)

| Surface number | r | d | nd | vd |
|---|---|---|---|---|
| Object surface | ∞ | ∞ | | |
| 1 | 55.06365 | 1.15000 | 1.84666 | 23.8 |
| 2 | 33.77211 | 5.33100 | 1.49700 | 81.6 |
| 3 | −359.85340 | 0.15000 | | |
| 4 | 29.08304 | 3.40000 | 1.72916 | 54.7 |
| 5 | 70.91069 | Variable | | |
| 6* | 161.39240 | 1.40000 | 1.85135 | 40.1 |
| 7* | 7.61723 | 3.83440 | | |
| 8 | −33.76150 | 0.80000 | 1.77250 | 49.6 |
| 9 | 13.45490 | 0.74860 | | |
| 10 | 13.93989 | 2.10000 | 1.92286 | 20.9 |
| 11 | 218.53200 | Variable | | |
| 12(Diaphragm) | ∞ | 1.20000 | | |
| 13 | 6.74429 | 2.00000 | 1.49700 | 81.6 |
| 14 | 78.71621 | 2.60000 | | |
| 15* | 13.25660 | 1.70000 | 1.74993 | 45.4 |
| 16 | −11.91012 | 0.45000 | 1.80610 | 33.3 |
| 17 | 9.13979 | Variable | | |
| 18* | 16.39540 | 2.90000 | 1.60602 | 57.4 |
| 19 | −12.74100 | 0.55000 | 1.68893 | 31.2 |
| 20 | −39.24927 | Variable | | |
| 21 | ∞ | 0.90000 | 1.51633 | 64.0 |
| 22 | ∞ | (BF) | | |
| Image surface | ∞ | | | |

TABLE 8

(Aspherical data)

Surface No. 6

K = 0.00000E+00, A4 = 8.01434E−05, A6 = −2.07152E−07,
A8 = −8.16499E−09 A10 = 5.00930E−11

TABLE 8-continued (Aspherical data)

Surface No. 7

K = 0.00000E+00, A4 = 7.45194E−05, A6 = −2.14902E−06,
A8 = 2.34958E−07 A10 = −4.86509E−09
Surface No. 15

K = 0.00000E+00, A4 = −4.76896E−04, A6 = −8.13015E−06,
A8 = −6.88452E−07 A10 = 1.23317E−08
Surface No. 18

K = 0.00000E+00, A4 = −2.06222E−05, A6 = 1.34005E−06,
A8 = −2.15312E−08 A10 = 0.00000E+00

TABLE 9

(Various data)
Zooming ratio 19.30892

|  | Wide-angle limit | Middle position | Telephoto limit |
|---|---|---|---|
| Focal length | 4.7485 | 30.0011 | 91.6883 |
| F-number | 2.89958 | 3.70329 | 4.63694 |
| View angle | 38.8253 | 6.8527 | 2.2306 |
| Image height | 3.6000 | 3.6000 | 3.6000 |
| Overall length of lens system | 73.6875 | 79.4214 | 90.6678 |
| BF | 0.91042 | 0.88931 | 0.88990 |
| d5 | 0.6000 | 21.3268 | 29.9805 |
| d11 | 28.7871 | 4.7044 | 2.1000 |
| d17 | 4.9487 | 6.2930 | 21.9349 |
| d20 | 7.2273 | 14.9939 | 4.5485 |
| Entrance pupil position | 18.8455 | 95.2133 | 246.8611 |
| Exit pupil position | −29.3912 | −42.9194 | 89.1658 |
| Front principal points position | 22.8499 | 104.6690 | 433.7819 |
| Back principal points position | 68.9390 | 49.4202 | −1.0204 |

NUMERICAL EXAMPLE 4

The zoom lens system of Numerical Example 4 corresponds to Embodiment 4 shown in FIG. 10. Table 10 shows the surface data of the zoom lens system of Numerical Example 4. Table 11 shows the aspherical data. Table 12 shows various data.

TABLE 10

(Surface data)

| Surface number | r | d | nd | vd |
|---|---|---|---|---|
| Object surface | ∞ | ∞ |  |  |
| 1 | 55.61903 | 1.15000 | 1.84666 | 23.8 |
| 2 | 33.97817 | 5.33100 | 1.49700 | 81.6 |
| 3 | −419.22800 | 0.15000 |  |  |
| 4 | 29.06281 | 3.40000 | 1.72916 | 54.7 |
| 5 | 71.02901 | Variable |  |  |
| 6* | 196.83070 | 1.40000 | 1.80470 | 41.0 |
| 7* | 7.37979 | 4.00000 |  |  |
| 8 | −32.15681 | 0.80000 | 1.77250 | 49.6 |
| 9 | 14.08029 | 0.86240 |  |  |
| 10 | 14.69836 | 2.10000 | 1.92286 | 20.9 |
| 11 | 269.38190 | Variable |  |  |
| 12(Diaphragm) | ∞ | 1.20000 |  |  |
| 13 | 6.33147 | 2.00000 | 1.49700 | 81.6 |
| 14 | 108.63570 | 2.60000 |  |  |
| 15* | 13.05271 | 1.70000 | 1.80359 | 40.8 |

TABLE 10-continued (Surface data)

| Surface number | r | d | nd | vd |
|---|---|---|---|---|
| 16 | −10.76513 | 0.45000 | 1.90366 | 31.3 |
| 17 | 9.64478 | Variable |  |  |
| 18* | 16.26487 | 2.90000 | 1.60602 | 57.4 |
| 19 | −13.78007 | 0.55000 | 1.68893 | 31.2 |
| 20 | −52.86986 | Variable |  |  |
| 21 | ∞ | 0.90000 | 1.51633 | 64.0 |
| 22 | ∞ | (BF) |  |  |
| Image surface | ∞ |  |  |  |

TABLE 11

(Aspherical data)

Surface No. 6

K = 0.00000E+00, A4 = 7.87746E−05, A6 = −3.06820E−07,
A8 = −5.84784E−09 A10 = 4.01084E−11
Surface No. 7

K = 0.00000E+00, A4 = 5.80741E−05, A6 = −2.07929E−06,
A8 = 2.10065E−07 A10 = −4.58775E−09
Surface No. 15

K = 0.00000E+00, A4 = −5.65776E−04, A6 = −1.24320E−05,
A8 = −8.87354E−07 A10 = 4.47878E−09
Surface No. 18

K = 0.00000E+00, A4 = −1.84700E−05, A6 = 1.80779E−06,
A8 = −2.90134E−08 A10 = 0.00000E+00

TABLE 12

(Various data)
Zooming ratio 17.41282

|  | Wide-angle limit | Middle position | Telephoto limit |
|---|---|---|---|
| Focal length | 4.7500 | 30.0037 | 82.7116 |
| F-number | 2.92538 | 3.79111 | 4.68441 |
| View angle | 38.8123 | 6.8502 | 2.4719 |
| Image height | 3.6000 | 3.6000 | 3.6000 |
| Overall length of lens system | 72.7169 | 78.2875 | 88.5474 |
| BF | 0.91554 | 0.89425 | 0.89029 |
| d5 | 0.6000 | 21.4842 | 29.6706 |
| d11 | 28.4388 | 4.4953 | 2.1000 |
| d17 | 5.5127 | 6.3659 | 20.5383 |
| d20 | 5.7566 | 13.5544 | 3.8548 |
| Entrance pupil position | 18.8473 | 94.9334 | 226.0192 |
| Exit pupil position | −27.6984 | −38.6489 | 212.5058 |
| Front principal points position | 22.8088 | 102.1715 | 341.0592 |
| Back principal points position | 67.9669 | 48.2838 | 5.8358 |

NUMERICAL EXAMPLE 5

The zoom lens system of Numerical Example 5 corresponds to Embodiment 5 shown in FIG. 13. Table 13 shows the surface data of the zoom lens system of Numerical Example 5. Table 14 shows the aspherical data. Table 15 shows various data.

TABLE 13

(Surface data)

| Surface number | r | d | nd | vd |
|---|---|---|---|---|
| Object surface | ∞ | ∞ | | |
| 1 | 55.47918 | 1.15000 | 1.84666 | 23.8 |
| 2 | 33.92561 | 5.33100 | 1.49700 | 81.6 |
| 3 | −428.45160 | 0.15000 | | |
| 4 | 28.97697 | 3.40000 | 1.72916 | 54.7 |
| 5 | 70.51630 | Variable | | |
| 6* | 110.32640 | 1.40000 | 1.85135 | 40.1 |
| 7* | 7.64334 | 4.00000 | | |
| 8 | −26.94748 | 0.80000 | 1.77250 | 49.6 |
| 9 | 15.62717 | 0.98680 | | |
| 10 | 16.37548 | 2.10000 | 1.92286 | 20.9 |
| 11 | ∞ | Variable | | |
| 12(Diaphragm) | ∞ | 1.20000 | | |
| 13 | 6.26581 | 2.00000 | 1.48749 | 70.4 |
| 14 | 104.03850 | 2.60000 | | |
| 15* | 12.55302 | 1.70000 | 1.80359 | 40.8 |
| 16 | −9.57525 | 0.45000 | 1.90366 | 31.3 |
| 17 | 9.59047 | Variable | | |
| 18* | 16.34460 | 2.90000 | 1.60602 | 57.4 |
| 19 | −12.52151 | 0.55000 | 1.68893 | 31.2 |
| 20 | −57.95643 | Variable | | |
| 21 | ∞ | 0.90000 | 1.51633 | 64.0 |
| 22 | ∞ | (BF) | | |
| Image surface | ∞ | | | |

TABLE 14

(Aspherical data)

Surface No. 6

K = 0.00000E+00, A4 = 8.92689E−05, A6 = −4.58057E−07,
A8 = −5.97526E−09 A10 = 4.33448E−11

Surface No. 7

K = 0.00000E+00, A4 = 9.13150E−05, A6 = −1.44869E−06,
A8 = 1.99894E−07 A10 = −4.37390E−09

Surface No. 15

K = 0.00000E+00, A4 = −5.59272E−04, A6 = −1.19257E−05,
A8 = −8.81480E−07 A10 = −9.43841E−10

Surface No. 18

K = 0.00000E+00, A4 = −1.94842E−05, A6 = 2.08120E−06,
A8 = −3.30036E−08 A10 = 0.00000E+00

TABLE 15

(Various data)
Zooming ratio 17.39743

| | Wide-angle limit | Middle position | Telephoto limit |
|---|---|---|---|
| Focal length | 4.7532 | 29.9851 | 82.6927 |
| F-number | 2.93828 | 3.85063 | 4.70853 |
| View angle | 38.7944 | 6.8488 | 2.4712 |
| Image height | 3.6000 | 3.6000 | 3.6000 |
| Overall length of lens system | 72.7236 | 78.2588 | 88.4921 |
| BF | 0.91594 | 0.85644 | 0.83082 |
| d5 | 0.6000 | 21.4206 | 29.6678 |
| d11 | 28.4227 | 4.6155 | 2.1000 |
| d17 | 5.2005 | 5.9458 | 20.3876 |
| d20 | 5.9666 | 13.8026 | 3.8881 |
| Entrance pupil position | 18.8516 | 94.8926 | 227.5937 |
| Exit pupil position | −26.1469 | −36.3779 | 401.4385 |
| Front principal points position | 22.7700 | 100.7305 | 327.3556 |
| Back principal points position | 67.9704 | 48.2737 | 5.7994 |

NUMERICAL EXAMPLE 6

The zoom lens system of Numerical Example 6 corresponds to Embodiment 6 shown in FIG. 16. Table 16 shows the surface data of the zoom lens system of Numerical Example 6. Table 17 shows the aspherical data. Table 18 shows various data.

TABLE 16

(Surface data)

| Surface number | r | d | nd | vd |
|---|---|---|---|---|
| Object surface | ∞ | ∞ | | |
| 1 | 55.65528 | 1.15000 | 1.84666 | 23.8 |
| 2 | 33.98422 | 5.33100 | 1.49700 | 81.6 |
| 3 | −415.87930 | 0.15000 | | |
| 4 | 29.08477 | 3.40000 | 1.72916 | 54.7 |
| 5 | 70.97887 | Variable | | |
| 6* | 191.16030 | 1.40000 | 1.80470 | 41.0 |
| 7* | 7.39397 | 4.00000 | | |
| 8 | −31.80553 | 0.80000 | 1.77250 | 49.6 |
| 9 | 14.06302 | 0.85570 | | |
| 10 | 14.73530 | 2.10000 | 1.92286 | 20.9 |
| 11 | 284.21300 | Variable | | |
| 12(Diaphragm) | ∞ | 1.20000 | | |
| 13 | 6.37055 | 2.00000 | 1.49700 | 81.6 |
| 14 | 95.78405 | 2.60000 | | |
| 15* | 13.84957 | 1.70000 | 1.85135 | 40.1 |
| 16 | −10.30116 | 0.45000 | 1.90366 | 31.3 |
| 17 | 9.58050 | Variable | | |
| 18* | 16.54933 | 2.90000 | 1.60602 | 57.4 |
| 19 | −12.79538 | 0.55000 | 1.68893 | 31.2 |
| 20 | −54.32977 | Variable | | |
| 21 | ∞ | 0.90000 | 1.51633 | 64.0 |
| 22 | ∞ | (BF) | | |
| Image surface | ∞ | | | |

TABLE 17

(Aspherical data)

Surface No. 6

K = 0.00000E+00, A4 = 7.89832E−05, A6 = −3.03781E−07,
A8 = −5.85454E−09 A10 = 3.96602E−11

Surface No. 7

K = 0.00000E+00, A4 = 5.79983E−05, A6 = −1.94402E−06,
A8 = 2.07079E−07 A10 = −4.52430E−09

Surface No. 15

K = 0.00000E+00, A4 = −5.26852E−04, A6 = −1.26992E−05,
A8 = −6.90980E−07 A10 = 4.33611E−09

Surface No. 18

K = 0.00000E+00, A4 = −9.06513E−06, A6 = 1.64133E−06,
A8 = −2.22798E−08 A10 = 0.00000E+00

TABLE 18

(Various data)
Zooming ratio 17.42192

|  | Wide-angle limit | Middle position | Telephoto limit |
|---|---|---|---|
| Focal length | 4.7524 | 30.0086 | 82.7959 |
| F-number | 2.92211 | 3.79007 | 4.72720 |
| View angle | 38.7987 | 6.8504 | 2.4693 |
| Image height | 3.6000 | 3.6000 | 3.6000 |
| Overall length of lens system | 72.6911 | 78.4559 | 88.4846 |
| BF | 0.93105 | 0.91089 | 0.91195 |
| d5 | 0.6000 | 21.5040 | 29.6351 |
| d11 | 28.3436 | 4.4919 | 2.1000 |
| d17 | 5.6902 | 6.6609 | 20.9512 |
| d20 | 5.6395 | 13.4015 | 3.3997 |
| Entrance pupil position | 18.8468 | 94.9564 | 223.8747 |
| Exit pupil position | −27.8009 | −39.1013 | 252.9642 |
| Front principal points position | 22.8131 | 102.4589 | 333.8680 |
| Back principal points position | 67.9387 | 48.4474 | 5.6887 |

NUMERICAL EXAMPLE 7

The zoom lens system of Numerical Example 7 corresponds to Embodiment 7 shown in FIG. 19. Table 19 shows the surface data of the zoom lens system of Numerical Example 7. Table 20 shows the aspherical data. Table 21 shows various data.

TABLE 19

(Surface data)

| Surface number | r | d | nd | vd |
|---|---|---|---|---|
| Object surface | ∞ | ∞ | | |
| 1 | 55.53261 | 1.15000 | 1.84666 | 23.8 |
| 2 | 34.01776 | 5.33100 | 1.49700 | 81.6 |
| 3 | −403.89570 | 0.15000 | | |
| 4 | 29.11513 | 3.40000 | 1.72916 | 54.7 |
| 5 | 70.83043 | Variable | | |
| 6* | 168.69110 | 1.40000 | 1.80470 | 41.0 |
| 7* | 7.33612 | 4.00000 | | |
| 8 | −33.00469 | 0.80000 | 1.77250 | 49.6 |
| 9 | 13.76154 | 0.83630 | | |
| 10 | 14.29715 | 2.10000 | 1.92286 | 20.9 |
| 11 | 194.02790 | Variable | | |
| 12(Diaphragm) | ∞ | 1.20000 | | |
| 13 | 6.47544 | 2.00000 | 1.49700 | 81.6 |
| 14 | 109.77920 | 2.60000 | | |
| 15* | 13.86477 | 1.70000 | 1.84924 | 23.1 |
| 16 | −19.65073 | 0.45000 | 1.92286 | 20.9 |
| 17 | 9.76275 | Variable | | |
| 18* | 16.28387 | 2.90000 | 1.60602 | 57.4 |
| 19 | −14.64065 | 0.55000 | 1.68893 | 31.2 |
| 20 | −53.81416 | Variable | | |

TABLE 19-continued (Surface data)

| Surface number | r | d | nd | vd |
|---|---|---|---|---|
| 21 | ∞ | 0.90000 | 1.51633 | 64.0 |
| 22 | ∞ | (BF) | | |
| Image surface | ∞ | | | |

TABLE 20

(Aspherical data)

Surface No. 6

K = 0.00000E+00, A4 = 7.10386E−05, A6 = −2.35652E−07,
A8 = −6.02768E−09 A10 = 3.94995E−11
Surface No. 7

K = 0.00000E+00, A4 = 5.19819E−05, A6 = −2.33845E−06,
A8 = 2.14138E−07 A10 = −4.61514E−09
Surface No. 15

K = 0.00000E+00, A4 = −5.19122E−04, A6 = −1.10512E−05,
A8 = −6.86645E−07 A10 = 6.14679E−09
Surface No. 18

K = 0.00000E+00, A4 = −1.66174E−05, A6 = 1.73547E−06,
A8 = −2.74789E−08 A10 = 0.00000E+00

TABLE 21

(Various data)
Zooming ratio 17.40781

|  | Wide-angle limit | Middle position | Telephoto limit |
|---|---|---|---|
| Focal length | 4.7505 | 30.0036 | 82.6959 |
| F-number | 2.91065 | 3.70618 | 4.65217 |
| View angle | 38.8081 | 6.8521 | 2.4713 |
| Image height | 3.6000 | 3.6000 | 3.6000 |
| Overall length of lens system | 72.6843 | 78.2467 | 88.4785 |
| BF | 0.91976 | 0.89940 | 0.89713 |
| d5 | 0.6000 | 21.6792 | 29.6743 |
| d11 | 28.1468 | 4.3352 | 2.1000 |
| d17 | 5.9425 | 6.5548 | 20.8569 |
| d20 | 5.6080 | 13.3108 | 3.4829 |
| Entrance pupil position | 18.8486 | 96.5927 | 226.8964 |
| Exit pupil position | −29.4322 | −39.5621 | 184.4422 |
| Front principal points position | 22.8556 | 104.3476 | 346.8508 |
| Back principal points position | 67.9338 | 48.2431 | 5.7826 |

The following Table 22 shows the corresponding values to the individual conditions in the zoom lens systems of the numerical examples.

TABLE 22

(Corresponding values to conditions)

| Condition | | Numerical Example | | | | | | |
|---|---|---|---|---|---|---|---|---|
| | | 1 | 2 | 3 | 4 | 5 | 6 | 7 |
| (6) | $nd_8$ | 1.4970 | 1.4970 | 1.4970 | 1.4970 | 1.4875 | 1.4970 | 1.4970 |
| | $vd_8$ | 81.61 | 81.61 | 81.61 | 81.61 | 70.44 | 81.61 | 81.61 |
| (7) | $(nd_9 − 1) + (nd_{10} − 1)$ | 1.5560 | 1.5560 | 1.5560 | 1.7072 | 1.7072 | 1.7550 | 1.7721 |
| (1) | $\sqrt{(f_4 \cdot f_W \tan\omega)/L_W}$ | 0.122 | 0.123 | 0.122 | 0.129 | 0.131 | 0.131 | 0.129 |

TABLE 22-continued (Corresponding values to conditions)

| Condition | Numerical Example | | | | | | |
|---|---|---|---|---|---|---|---|
| | 1 | 2 | 3 | 4 | 5 | 6 | 7 |
| (2) $f_3/f_4$ | 0.866 | 0.876 | 0.875 | 0.737 | 0.707 | 0.707 | 0.736 |
| (8) dG3/dG | 0.229 | 0.231 | 0.232 | 0.230 | 0.229 | 0.230 | 0.230 |
| (9) $\sqrt{(f_3^2+f_4^2)/|f_2|}$ | 3.31 | 3.45 | 3.43 | 3.45 | 3.54 | 3.51 | 3.46 |
| (10) $m_{2T}/m_{34T}$ | 3.324 | 3.181 | 3.018 | 2.230 | 2.234 | 2.139 | 2.232 |
| (11) d1NG/d1G | 0.11464 | 0.11464 | 0.11464 | 0.11464 | 0.11464 | 0.11464 | 0.11464 |
| (12) $f_W \cdot \tan(\omega - \omega_0)$ | 0.11737 | 0.13778 | 0.13747 | 0.13716 | 0.13731 | 0.13726 | 0.13707 |
| (13) $f_4/f_T$ | 0.252 | 0.230 | 0.232 | 0.277 | 0.289 | 0.286 | 0.276 |
| (14) $|M_1/M_2|$ | 0.904 | 1.215 | 1.133 | 1.034 | 1.032 | 1.043 | 1.018 |
| (15) $|M_3/M_2|$ | 0.618 | 0.976 | 0.953 | 0.855 | 0.852 | 0.859 | 0.823 |
| (16) $(m_{2T}/m_{2W})/(f_T/f_W)$ | 0.564 | 0.521 | 0.503 | 0.457 | 0.458 | 0.449 | 0.460 |
| (17) $m_{3T}/m_{3W}$ | 1.500 | 1.519 | 1.593 | 1.920 | 1.901 | 1.931 | 1.885 |
| (18) $\sqrt{(f_3^2+f_4^2)}/(f_W \cdot \tan\omega)$ | 7.26 | 7.34 | 7.38 | 7.45 | 7.66 | 7.58 | 7.43 |
| (19) $(L_T - L_W)/(f_W \cdot \tan\omega)$ | 4.21 | 4.48 | 4.44 | 4.14 | 4.13 | 4.13 | 4.13 |
| (20) $(L_T \cdot f_T)/f_4(f_W \cdot \tan\omega)$ | 93.2 | 102.4 | 102.5 | 83.7 | 80.2 | 81.1 | 83.8 |
| (21) $(L_W \cdot f_T)/f_4(f_W \cdot \tan\omega)$ | 76.5 | 82.9 | 83.3 | 68.7 | 65.9 | 66.6 | 68.8 |
| (22) $f_3/f_W \cdot \tan\omega$ | 4.76 | 4.84 | 4.86 | 4.42 | 4.42 | 4.38 | 4.40 |

Industrial Applicability

The zoom lens system according to the present invention is applicable to a digital input device such as a digital still camera, a digital video camera, a mobile telephone, a PDA (Personal Digital Assistance), a surveillance camera in a surveillance system, a Web camera or a vehicle-mounted camera. In particular, the zoom lens system according to the present invention is suitable for a photographing optical system where high image quality is required like in a digital still camera, a digital video camera or the like.

The invention claimed is:

1. A zoom lens system, in order from an object side to an image side, consisting of a first lens unit having positive optical power, a second lens unit having negative optical power, a third lens unit having positive optical power, and a fourth lens unit having positive optical power, wherein
in zooming from a wide-angle limit to a telephoto limit, all of the first lens unit, the second lens unit, the third lens unit and the fourth lens unit move along an optical axis, wherein
the third lens unit is composed of three or more lens elements, and wherein
the following conditions are satisfied:

$nd_8 \leq 1.5$ and $vd_8 \geq 75$, $(nd_9-1)+(nd_{10}-1) \geq 1.55$, $16 < f_T/f_W$, and $\omega > 35$, where
$nd_8$ is a refractive index to the d-line of a lens element arranged on the most object side in the third lens unit,
$nd_9$ is a refractive index to the d-line of a lens element arranged at the second position from the object side in the third lens unit,
$nd_{10}$ is a refractive index to the d-line of a lens element arranged at the third position from the object side in the third lens unit,
$vd_8$ is an Abbe number to the d-line of a lens element arranged on the most object side in the third lens unit,
$\omega$ is a half view angle (°) at a wide-angle limit,
$f_T$ is a focal length of the entire system at a telephoto limit, and
$f_W$ is a focal length of the entire system at a wide-angle limit.

2. The zoom lens system as claimed in claim 1, wherein the third lens unit moves in a direction perpendicular to the optical axis.

3. An imaging device capable of outputting an optical image of an object as an electric image signal, comprising:
a zoom lens system that forms the optical image of the object; and
an image sensor that converts the optical image formed by the zoom lens system into the electric image signal, wherein
in the zoom lens system,
the zoom lens system, in order from an object side to an image side, consists of a first lens unit having positive optical power, a second lens unit having negative optical power, a third lens unit having positive optical power, and a fourth lens unit having positive optical power, wherein
in zooming from a wide-angle limit to a telephoto limit, all of the first lens unit, the second lens unit, the third lens unit and the fourth lens unit move along an optical axis, wherein
the third lens unit is composed of three or more lens elements, and wherein
the following conditions are satisfied:

$nd_8 \leq 1.5$ and $vd_8 \geq 75$, $(nd_9-1)+(nd_{10}-1) \geq 1.55$, $16 < f_T/f_W$, and $\omega > 35$, where
$nd_8$ is a refractive index to the d-line of a lens element arranged on the most object side in the third lens unit,
$nd_9$ is a refractive index to the d-line of a lens element arranged at the second position from the object side in the third lens unit,
$nd_{10}$ is a refractive index to the d-line of a lens element arranged at the third position from the object side in the third lens unit,
$vd_8$ is an Abbe number to the d-line of a lens element arranged on the most object side in the third lens unit,
$\omega$ is a half view angle (°) at a wide-angle limit, $f_T$ is a focal length of the entire system at a telephoto limit, and $f_W$ is a focal length of the entire system at a wide-angle limit.

4. A camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, consists of a first lens unit having positive optical power, a second lens unit having negative optical power, a third lens unit having positive optical power, and a fourth lens unit having positive optical power, wherein in zooming from a wide-angle limit to a telephoto limit, all of the first lens unit, the second lens unit, the third lens unit and the fourth lens unit move along an optical axis, wherein the third lens unit is composed of three or more lens elements, and wherein the following conditions are satisfied:

$nd_8 \leq 1.5$ and $vd_8 \geq 75$, $(nd_9-1)+(nd_{10}-1) \geq 1.55$, $16 < f_T/f_W$ and $\omega > 35$, where $nd_8$ is a refractive index to the d-line of a lens element arranged on the most object side in the third lens unit, $nd_9$ is a refractive index to the d-line of a lens element arranged at the second position from the object side in the third lens unit, $nd_{10}$ is a refractive index to the d-line of a lens element arranged at the third position from the object side in the third lens unit, $vd_8$ is an Abbe number to the d-line of a lens element arranged on the most object side in the third lens unit, $\omega$ is a half view angle (°) at a wide-angle limit, $f_T$ is a focal length of the entire system at a telephoto limit, and $f_W$ is a focal length of the entire system at a wide-angle limit.

* * * * *